United States Patent
Takao et al.

(10) Patent No.: US 10,041,784 B2
(45) Date of Patent: Aug. 7, 2018

(54) DISTANCE IMAGE ACQUISITION APPARATUS AND DISTANCE IMAGE ACQUISITION METHOD

(71) Applicant: FUJIFILM Corporation, Tokyo (JP)

(72) Inventors: Hiroaki Takao, Saitama (JP); Takeshi Misawa, Saitama (JP); Takeshi Kamiya, Saitama (JP); Tomonori Masuda, Saitama (JP); Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/814,937

(22) Filed: Nov. 16, 2017

(65) Prior Publication Data
US 2018/0073873 A1 Mar. 15, 2018

Related U.S. Application Data

(63) Continuation of application No. PCT/JP2016/063248, filed on Apr. 27, 2016.

(30) Foreign Application Priority Data

Jun. 9, 2015 (JP) .................................. 2015-116734

(51) Int. Cl.
*G01B 11/02* (2006.01)
*G01S 7/48* (2006.01)
(Continued)

(52) U.S. Cl.
CPC ............ *G01B 11/026* (2013.01); *G01B 11/25* (2013.01); *G01C 3/06* (2013.01); *G01S 7/4808* (2013.01);
(Continued)

(58) Field of Classification Search
CPC ....... G01B 11/25; G01B 11/026; G01B 11/14; G01C 3/06; G01C 3/08; G01S 17/08;
(Continued)

(56) References Cited

U.S. PATENT DOCUMENTS 4,697,904 A 10/1987 Takahashi et al.
9,235,916 B2 * 1/2016 Tanaka .................... H04N 1/409
(Continued)

FOREIGN PATENT DOCUMENTS

JP 61-128216 A 6/1986
JP 7-72237 A 3/1995
(Continued)

OTHER PUBLICATIONS

International Preliminary Report on Patentability and Written Opinion of the International Searching Authority (Forms PCT/IB/326, PCT/IB/373 and PCT/ISA/237) issued in International Application No. PCT/JP2016/063248 dated Dec. 21, 2017, together with an English translation.
(Continued)

*Primary Examiner* — Gordon J Stock, Jr.
(74) *Attorney, Agent, or Firm* — Birch, Stewart, Kolasch & Birch, LLP

(57) ABSTRACT

A distance image acquisition apparatus includes a projection unit which performs a plurality of times of light emission with a plurality of light emission intensities to project a first pattern of structured light onto a subject within a distance measurement region, an imaging unit which is provided in parallel with and apart from the projection unit by a baseline length, images the subject in synchronization with each of the plurality of times of light emission, and generates a plurality of captured images corresponding to the plurality of light emission intensities, a normalization unit which normalizes a plurality of captured images with coefficients
(Continued)

corresponding to the plurality of light emission intensities to acquire a plurality of normalized images, a discrimination unit which compares a plurality of normalized images and discriminates the first pattern projected from the projection unit, and a distance image acquisition unit.

16 Claims, 20 Drawing Sheets

(51) Int. Cl.
    *G01S 17/08*     (2006.01)
    *G06T 7/55*     (2017.01)
    *G01C 3/06*     (2006.01)
    *G01B 11/25*     (2006.01)
    *G06T 7/254*     (2017.01)
    *G03B 21/20*     (2006.01)
    *G01S 17/48*     (2006.01)

(52) U.S. Cl.
    CPC .......... *G01S 17/08* (2013.01); *G03B 21/2053* (2013.01); *G06T 7/254* (2017.01); *G06T 7/55* (2017.01); *G01S 17/48* (2013.01)

(58) Field of Classification Search
    CPC .......... G01S 17/48; G01S 17/06; G01S 17/46; G01S 7/4861; G01S 7/4873; G01S 7/4876; G01S 7/497; G01S 7/4808; G06T 2207/10028; G06T 7/254; G06T 7/55; G03B 21/2053
    See application file for complete search history.

(56) References Cited

U.S. PATENT DOCUMENTS

| | | | | |
|---|---|---|---|---|
| 9,906,793 | B2* | 2/2018 | Fu | H04N 19/136 |
| 9,927,223 | B2* | 3/2018 | Takao | G01B 11/026 |
| 2011/0080471 | A1* | 4/2011 | Song | G01B 11/245 348/46 |
| 2012/0229816 | A1* | 9/2012 | Rodrigue | G01B 11/245 356/610 |
| 2012/0310098 | A1 | 12/2012 | Popovic | |
| 2013/0038882 | A1 | 2/2013 | Umeda et al. | |
| 2013/0258354 | A1 | 10/2013 | Ando | |
| 2016/0309084 | A1* | 10/2016 | Venkataraman | H04N 5/23232 |
| 2017/0353712 | A1* | 12/2017 | Price | G02B 5/208 |
| 2018/0011194 | A1* | 1/2018 | Masuda | G01S 17/32 |
| 2018/0012372 | A1* | 1/2018 | Takao | G06T 7/521 |
| 2018/0033146 | A1* | 2/2018 | Bleyer | G06T 7/0057 |
| 2018/0080761 | A1* | 3/2018 | Takao | G01B 11/25 |

FOREIGN PATENT DOCUMENTS

| | | |
|---|---|---|
| JP | 2001-147109 A | 5/2001 |
| JP | 2006-71620 A | 3/2006 |
| JP | 2011-22088 A | 2/2011 |
| JP | 2011-169701 A | 9/2011 |
| JP | 2012-237604 A | 12/2012 |
| JP | 2013-210262 A | 10/2013 |
| JP | 2014-115107 A | 6/2014 |

OTHER PUBLICATIONS

International Search Report (Form PCT/ISA/210) issued in International Application No. PCT/JP2016/063248 dated Jul. 12, 2016, together with an English translation.

Japanese Decision to Grant a Patent and English translation for Application No. 2017-523155, dated Jan. 31, 2018.

* cited by examiner

FIG. 7
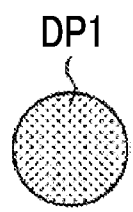
DP1
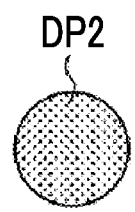
DP2

DISTANCE IMAGE ACQUISITION APPARATUS AND DISTANCE IMAGE ACQUISITION METHOD

CROSS-REFERENCE TO RELATED APPLICATIONS

The present application is a Continuation of PCT International Application No. PCT/JP2016/063248 filed on Apr. 27, 2016 claiming priority under 35 U.S.C § 119(a) to Japanese Patent Application No. 2015-116734 filed on Jun. 9, 2015. Each of the above applications is hereby expressly incorporated by reference, in their entirety, into the present application.

BACKGROUND OF THE INVENTION

1. Field of the Invention

The present invention relates to a distance image acquisition apparatus and a distance image acquisition method, and in particular, to a technique for projecting structured light distributed in a two-dimensional manner with respect to a subject within a distance measurement region and acquiring a distance image indicating a distance of the subject.

2. Description of the Related Art

Hitherto, this kind of distance image acquisition apparatus projects a dot pattern of structured light distributed in a two-dimensional manner with respect to a subject within a distance measurement region from a projection unit, images the subject with an imaging unit, and acquires a first image including the dot pattern reflected from the subject. Furthermore, the distance image acquisition apparatus images the subject with the imaging unit without projecting a dot pattern from the projection unit, and acquires a second image to be a background of the dot pattern. Then, the second image is subtracted from the first image, and the distance image (three-dimensional distance information) is calculated and acquired based on a subtraction result using a triangulation method (JP2011-169701A).

JP2014-115107A discloses that one distance measurement apparatus comprises a plurality of projection units, and a plurality of projection units perform projection one by one in sequence, or colors of pattern light projected from a plurality of projection units are made different such that patterns projected from a plurality of projection units are confused in an imaging unit.

SUMMARY OF THE INVENTION

There is a demand for a distance image acquisition apparatus that can perform a distance measurement of the same subject with a plurality of apparatuses. For example, there is a case where a distance measurement of an object having such a size that a distance image cannot be acquired with one distance image acquisition apparatus should be performed simultaneously with a plurality of distance image acquisition apparatuses, or a case where a user himself or herself uses the distance image acquisition apparatus without knowing that another person is using the distance image acquisition apparatus. In particular, in a case where a distance image is used for other purposes without being directly displayed or the like, and the user himself or herself is unaware of distance image acquisition being performed, there is a high possibility that the distance image acquisition apparatus is used simultaneously at the same place.

In the distance image acquisition apparatus described in JP2011-169701A, in a case where a distance measurement of the same subject is performed simultaneously with a plurality of apparatuses, there is a problem in that a distance image cannot be acquired because dot patterns projected from a plurality of distance image acquisition apparatuses are mixed.

Specifically, in a case shown in FIG. 20, that is, in a case where, in a first exposure period during which a host apparatus is projecting a dot pattern, another apparatus is also projecting a dot pattern having the same shape, and in a second exposure period during which the host apparatus does not project a dot pattern, the another apparatus does not also project a dot pattern, the difference between a signal value obtained by imaging in the first exposure period and a signal value obtained by imaging in the second exposure period is identical in the dot pattern projected from the host apparatus and the dot pattern projected from the another apparatus. Accordingly, as described in JP2011-169701A, even though a captured image (second image) being not projected from the host apparatus is subtracted from a captured image (first image) being projected from the host apparatus, the dot pattern projected from the another apparatus cannot be excluded, and as a result, a distance image cannot be acquired.

The technique described in JP2014-115107A is a technique which, in a case where a plurality of projection units are provided in one apparatus, avoids pattern confusion in an imaging unit of one apparatus, and it is difficult to apply the technique to a case where patterns are projected from a plurality of projection units provided in each of a plurality of apparatuses. This is as follows. As described in JP2014-115107A, in a case where a plurality of projection units are provided in one apparatus, a projection timing or a wavelength range is instructed from a central processing unit (CPU), which performs integral control in the one apparatus, to each of a plurality of projection units, whereby it is possible to easily perform control of time division or wavelength range division (also referred to as frequency division) of a plurality of projection units. Meanwhile, in a case where a projection unit is provided in each of a plurality of independent apparatuses, a projection timing or a wavelength range cannot be instructed directly from a CPU of a host apparatus to a projection unit of another apparatus. In a case where special hardware is added in order to modulate a projection pattern, an apparatus cost is increased.

The invention has been accomplished in consideration of such a situation, and an object of the invention is to provide a distance image acquisition apparatus and a distance image acquisition method capable of, even in a case where patterns of structured light having the same shape are projected simultaneously from a host apparatus and another apparatus, acquiring a distance image based on the pattern projected from the host apparatus.

In order to attain the above-described object, a distance image acquisition apparatus according to an aspect of the invention comprises a projection unit which performs a plurality of times of light emission with a plurality of light emission intensities to project a first pattern of structured light distributed in a two-dimensional manner with respect to a subject within a distance measurement region, an imaging unit which is provided in parallel with and apart from the projection unit by a baseline length, images the subject in synchronization with each of the plurality of times of light emission and generates a plurality of captured images including the first pattern reflected from the subject and corresponding to the plurality of light emission intensities, a normalization unit which normalizes the plurality of captured images with coefficients corresponding to the plurality of light emission intensities to acquire a plurality of normalized images, a discrimination unit which compares the plurality of normalized images and discriminates the first pattern projected from the projection unit, and a distance image acquisition unit which acquires a distance image indicating a distance of the subject based on a result of the discrimination of the discrimination unit.

With this configuration, the plurality of times of light emission is performed with the plurality of light emission intensities and the first pattern is projected onto the subject by the projection unit, the subject is imaged in synchronization with each of the plurality of times of light emission by the imaging unit, and the plurality of captured images including the first pattern reflected from the subject and corresponding to the plurality of light emission intensities are generated. The plurality of captured images are normalized with the coefficients corresponding to the plurality of light emission intensities by the normalization unit, and the plurality of normalized images are acquired. The plurality of normalized images are compared by the discrimination unit, and only the first pattern projected from the host apparatus is discriminated in distinction from the second pattern projected from the another distance image acquisition apparatus. Therefore, even in a case where the patterns of structured light having the same shape are projected simultaneously from the host apparatus and the another apparatus, it is possible to acquire the distance image with high accuracy based on only the first pattern projected from the host apparatus.

The expression that the projection unit performs "a plurality of times of light emission with a plurality of light emission intensities" means that the light emission intensity is made different in at least one time of light emission among the plurality of times of light emission. That is, "a plurality of times of light emission with a plurality of light emission intensities" does not include a case where all of a plurality of times of light emission are performed with the same light emission intensity. In a case where light emission is performed two times, the light emission intensity is different in the first light emission and the second light emission.

The expression that the imaging unit "generates" "captured images" includes reading of an imaging signal, that is, a case of simply reading electric charge from a light receiving element of the imaging unit as an imaging signal.

The expression that the normalization unit "normalizes a plurality of captured images with the coefficients corresponding to a plurality of light emission intensities" includes a case of performing an arithmetic operation for normalizing only a captured image other than a captured image to be a reference without performing an arithmetic operation for normalizing the captured image to be a reference among a plurality of captured images. A reference captured image not subjected to an arithmetic operation for normalization can be used as a normalized image as it is.

The expression that the discrimination unit "discriminates the first pattern" is not limited to a case where the first pattern in the normalized image is discriminated based on the result of the comparison of a plurality of normalized images, and includes a case where the first pattern in the captured image is discriminated based on the result of the comparison of a plurality of normalized images. The above-described expression also includes a case where a first pattern in a pattern (for example, binary image data) extracted from at least one image (multi-value image data) among a plurality of captured images and a plurality of normalized images is discriminated.

According to another aspect of the invention, in the distance image acquisition apparatus, the discrimination unit may calculate the difference of pixel values of the plurality of normalized images at corresponding positions of the plurality of normalized images and may discriminate a pixel having an absolute value of the difference of the pixel values equal to or less than a threshold to be a pixel indicating the first pattern.

According to a further aspect of the invention, in the distance image acquisition apparatus, the discrimination unit may calculate a ratio of pixel values of the plurality of normalized images at corresponding positions of the plurality of normalized images and may discriminate a pixel having the ratio of the pixel values within a range of an upper limit value and a lower limit value to be a pixel indicating the first pattern.

According to still another aspect of the invention, the distance image acquisition apparatus may further comprise a position correction unit which detects a correspondence relationship between pixel positions of the plurality of normalized images and corrects displacement in pixel positions, and the discrimination unit may compare the plurality of normalized images after the displacement in pixel positions is corrected by the position correction unit. That is, since normalization of the pixel positions is performed, even in a case where displacement in pixel positions of a plurality of normalized images occurs due to camera shake or the like, it is possible to reliably discriminate the first pattern and to acquire the distance image with high accuracy.

As an aspect in which the second pattern projected from the another distance image acquisition apparatus is eliminated, there are a first aspect in which the second pattern is eliminated from the captured image or the normalized image, and a second aspect in which a pattern is extracted from the captured image or the normalized image and the second pattern is eliminated from image data of the extracted pattern.

According to still another aspect of the invention, the distance image acquisition apparatus may further comprise a noise elimination unit which eliminates noise from at least one image of the plurality of captured images and the plurality of normalized images based on the result of the discrimination of the discrimination unit, and the distance image acquisition unit may acquire the distance image from an image with noise eliminated by the noise elimination unit. That is, it is possible to acquire the distance image by easily extracting the first pattern from an image with noise eliminated by the noise elimination unit.

According to still another aspect of the invention, the distance image acquisition apparatus may further comprise a pattern extraction unit which extracts a pattern including the first pattern and a second pattern of structured light projected from another distance image acquisition apparatus from at least one image of the plurality of captured images and the plurality of normalized images, and a noise elimination unit which eliminates the second pattern from the pattern extracted by the pattern extraction unit based on the result of the discrimination of the discrimination unit, and the distance image acquisition unit may acquire the distance image from the first pattern which remains after the second pattern is eliminated by the noise elimination unit. That is, it is possible to easily acquire the distance image from the first pattern which remains after the second pattern is eliminated by the noise elimination unit.

According to still another aspect of the invention, in the distance image acquisition apparatus, the projection unit may emit light in an invisible wavelength range to project the first pattern onto the subject, and the imaging unit may image the subject in the invisible wavelength range. That is, it is possible to avoid an adverse effect due to outside light in a visible wavelength range, and to acquire the distance image with high accuracy.

According to still another aspect of the invention, in the distance image acquisition apparatus, the imaging unit may image the subject in a period during which the projection unit is non-light emission, and the normalization unit may acquire the plurality of normalized images based on a result of subtracting a captured image captured by the imaging unit in a non-light emission period of the projection unit from each of the plurality of captured images captured by the imaging unit in a light emission period of the projection unit. That is, since the normalized images are acquired from the captured images with a component of noise due to light at a given level, such as background light, eliminated, it is possible to improve the discrimination accuracy of the first pattern, and to acquire the distance image with high accuracy.

According to still another aspect of the invention, in the distance image acquisition apparatus, the first pattern projected from the projection unit and a second pattern projected from another distance image acquisition apparatus may be dot patterns, and the distance image acquisition apparatus may further comprise a pattern comparison unit which compares the number of projected dots that is the number of dots of the first pattern projected from the projection unit with the number of discriminated dots that is the number of dots of a pattern discriminated to be a first pattern by the discrimination unit, and a projection control unit which changes a projection condition of the first pattern in the projection unit based on a result of the comparison of the number of projected dots and the number of discriminated dots of the pattern comparison unit. That is, it is possible to simply and reliably check that the discrimination of the first pattern is correct by comparing the number of projected dots and the number of discriminated dots, and even in an uncommon case where the second pattern is discriminated to be the first pattern according to a light emission timing and a set value, such as a threshold, it is possible to reliably acquire the distance image with high accuracy by changing the projection condition.

According to still another aspect of the invention, in the distance image acquisition apparatus, the projection control unit may change a combination of the plurality of light emission intensities based on the result of the comparison of the pattern comparison unit.

According to still another aspect of the invention, in the distance image acquisition apparatus, the projection control unit may change a light emission timing of the first pattern based on the result of the comparison of the pattern comparison unit.

According to still another aspect of the invention, in the distance image acquisition apparatus, the projection control unit may modulate a switching timing of light emission and non-light emission of the first pattern with a code based on the result of the comparison of the pattern comparison unit.

According to still another aspect of the invention, in the distance image acquisition apparatus, the projection control unit may change the number of times of light emission of the plurality of times of light emission based on the result of the comparison of the pattern comparison unit.

According to still another aspect of the invention, the distance image acquisition apparatus may further comprise an another-apparatus projection detection unit which detects whether or not a second pattern of structured light is projected from another distance image acquisition apparatus, and in a case where the another-apparatus projection detection unit detects that the second pattern is projected from the another distance image acquisition apparatus, intensity modulation to perform a plurality of times of light emission with the plurality of light emission intensities starts with the projection unit. That is, in a case where the second dot pattern is projected from the another apparatus, it is possible to prevent the influence of noise due to mixing of the second dot pattern through the intensity modulation and to acquire the distance image with high accuracy, and in a case where the second dot pattern is not projected from the another apparatus, it is possible to prevent addition of arithmetic operation noise due to the intensity modulation because the intensity modulation is not performed and to acquire the distance image with extremely high accuracy.

According to still another aspect of the invention, in the distance image acquisition apparatus, the imaging unit may perform exposure in an exposure period corresponding to a frame rate of the distance image, and the projection unit may project the first pattern in synchronization with start and end timings of the exposure period of the imaging unit. That is, it is possible to acquire the distance image as video having a given frame rate.

A distance image acquisition method according to still another aspect of the invention comprises a step of, with a projection unit, performing a plurality of times of light emission with a plurality of light emission intensities to project a first pattern of structured light distributed in a two-dimensional manner with respect to a subject within a distance measurement region, a step of, with an imaging unit provided in parallel with and apart from the projection unit by a baseline length, imaging the subject in synchronization with each of the plurality of times of light emission and generating a plurality of captured images including the first pattern reflected from the subject and corresponding to the plurality of light emission intensities, a step of normalizing the plurality of captured images with coefficients corresponding to the plurality of light emission intensities to acquire a plurality of normalized images, a step of comparing the plurality of normalized images and discriminating the first pattern projected from the projection unit, and a step of acquiring a distance image indicating a distance of the subject based on a result of the discrimination.

According to the invention, even in a case where the patterns of structured light having the same shape are projected simultaneously from the host apparatus and the another apparatus, it is possible to acquire the distance image based on the pattern projected from the host apparatus.

BRIEF DESCRIPTION OF THE DRAWINGS

FIG. 7 is an explanatory view illustrating a first dot pattern projected from the host apparatus and a second dot pattern projected from the another apparatus.

DESCRIPTION OF THE PREFERRED EMBODIMENTS

Hereinafter, an embodiment of a distance image acquisition apparatus and a distance image acquisition method according to the invention will be described referring to the accompanying drawings.

First Embodiment

Figure 1:
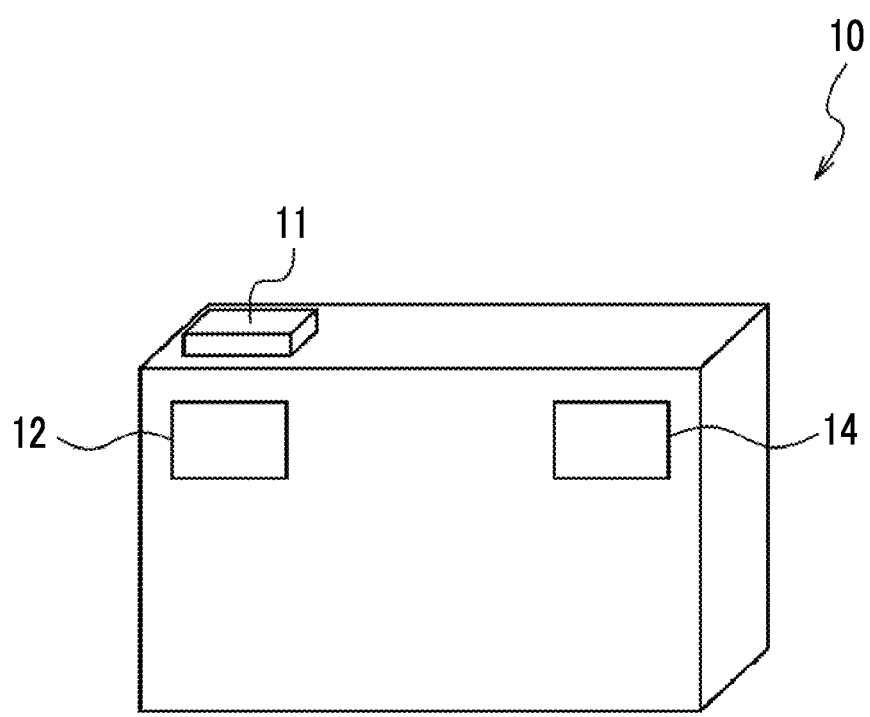
FIG. 1 is an appearance diagram of an example of a distance image acquisition apparatus according to the invention.

FIG. 1 is an appearance diagram showing an example of a distance image acquisition apparatus 10 according to the invention.

As shown in FIG. 1, the distance image acquisition apparatus 10 has a projection unit 12 and an imaging unit 14. Though will be described below in detail, in a case where an imaging instruction input by the operation of the shutter button 11 is applied, the distance image acquisition apparatus 10 acquires a distance image indicating a distance (depth information) of a subject within an imaging region (distance measurement region).

Figure 3:
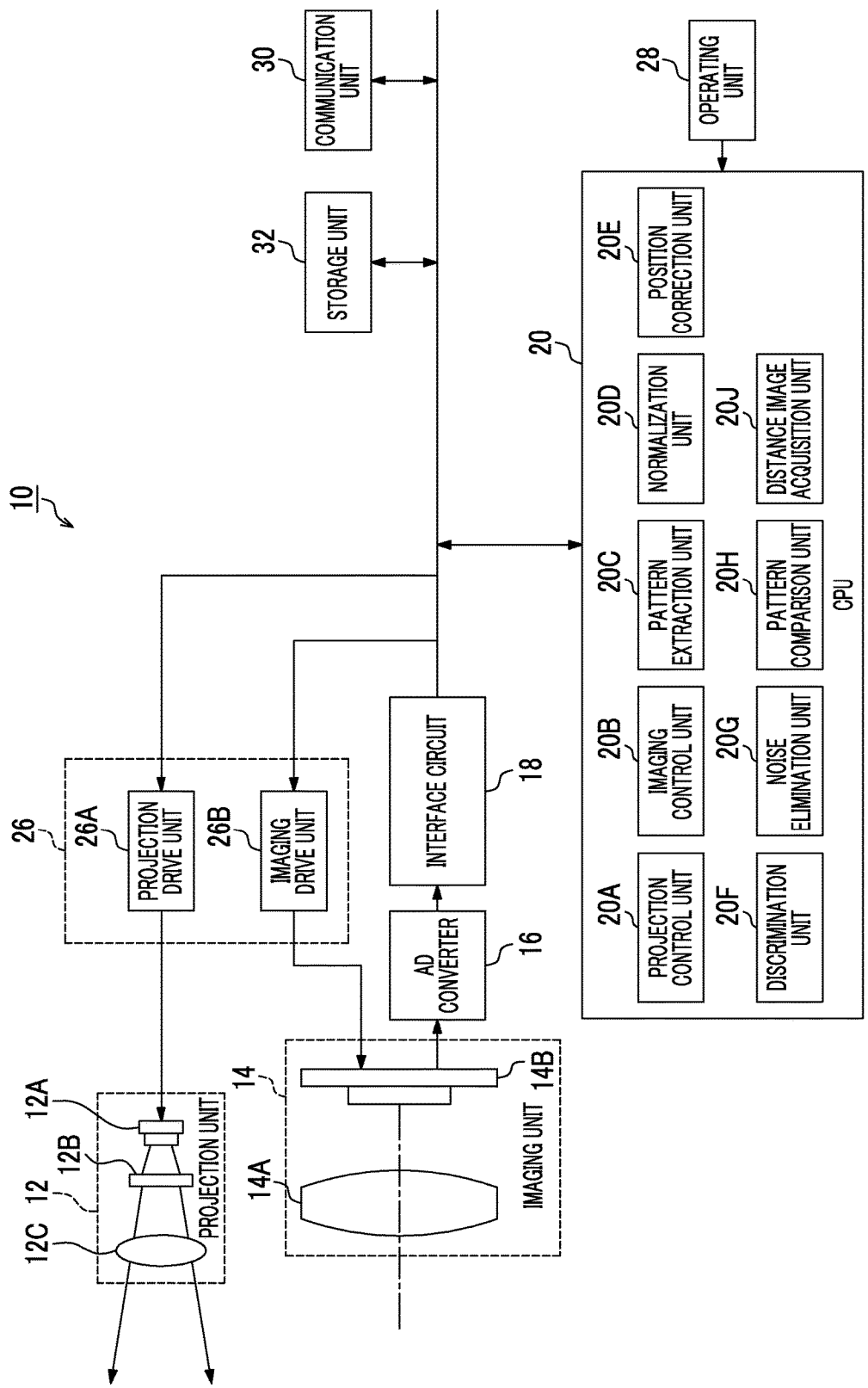
FIG. 3 is a block diagram showing an internal configuration example of a distance image acquisition apparatus of a first embodiment.

The distance image acquisition apparatus 10 has a static image mode in which a distance image for one frame is acquired like static image capturing and a video mode in which a distance image continuous at a given frame rate (for example, 30 frames/second, 60 frames/second) is acquired like video capturing. The static image mode and the video mode can be appropriately selected by an operation of a mode selection unit of an operating unit 28 (FIG. 3). Then, in a case where a shutter button 11 is operated with one push when the static image mode is selected, a distance image for one frame is acquired. In a case where the shutter button 11 is operated with one push when the video mode is selected, acquisition of a distance image continuous at a given frame rate is started, and in a case where the shutter button 11 is operated with one push again, distance image acquisition is stopped. An operation to acquire a distance image may be performed as a background operation of other functions (a function prepared in a main body and a function added by an application or the like later), regardless of a static image or video. This case is performed according to demand on other functions without performing the above-described explicit operation instruction.

Figure 2:
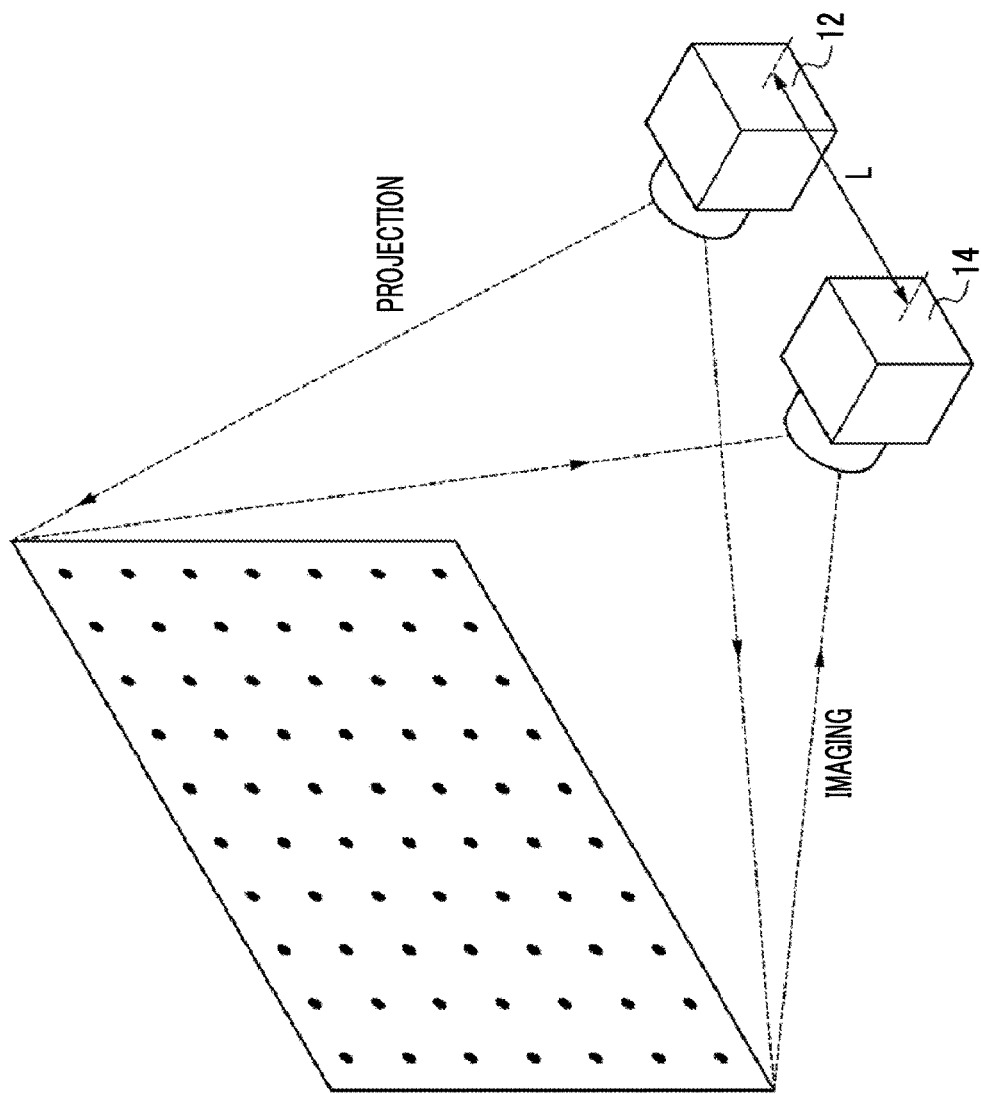
FIG. 2 is a diagram illustrating the principle of distance image acquisition.

FIG. 2 is a diagram illustrating the principle of distance image acquisition in the distance image acquisition apparatus 10.

As shown in FIG. 2, at the time of acquisition of the distance image, the projection unit 12 projects a pattern (first pattern) of structured light distributed in a two-dimensional manner with respect to a subject within a distance measurement region. In this embodiment, as the first pattern of structured light, a matrix-shaped dot pattern is projected onto the subject. Hereinafter, the first pattern of structured light projected from the projection unit 12 may be referred to as a "first dot pattern".

The imaging unit 14 captures an image including the first dot pattern reflected from the subject. As shown in FIG. 2, the imaging unit 14 is provided in parallel with and apart from the projection unit 12 by a baseline length L, and parallax according to the distance of the subject is generated between the corresponding dots of the first dot pattern projected from the projection unit 12 and the first dot pattern imaged by the imaging unit 14. Accordingly, it is possible to obtain the distance image the distance image indicating the distance of the subject based on a light receiving position (not shown) of each dot of the first dot pattern projected from the projection unit 12 on an image sensor imaged by the imaging unit 14 using a triangulation method.

As shown in FIG. 2, although the projection unit 12 of this embodiment projects the matrix-shaped first dot pattern, the invention is not limited thereto, and the projection unit 12 may project a dot pattern in which a dot interval is random (pseudo random) or a mesh-shaped pattern.

FIG. 3 is a block diagram showing an internal configuration example of the distance image acquisition apparatus 10.

The distance image acquisition apparatus 10 comprises, in addition to the projection unit 12 and the imaging unit 14 described above, an analog-to-digital (AD) converter 16, an interface circuit 18, a central processing unit (CPU) 20, a drive unit 26 (a projection drive unit 26A and an imaging drive unit 26B), an operating unit 28, a communication unit 30, and a storage unit 32.

The projection unit 12 has a near infrared light emitting diode (near infrared LED) 12A, a diffraction optical element 12B, and a projection lens 12C functioning as a projection optical system. That is, the projection unit 12 of this embodiment emits light (in this example, near infrared light) in an invisible wavelength range to project the first dot pattern onto the subject.

The diffraction optical element 12B functions as an element which converts a light intensity distribution using a diffraction phenomenon of light. In this example, near infrared light emitted from the near infrared LED 12A enters the diffraction optical element 12B, and the diffraction optical element 12B converts near infrared light to the matrix-shaped first dot pattern shown in FIG. 2. The projection lens 12C projects the first dot pattern of near infrared light converted by the diffraction optical element 12B onto the subject within the distance measurement region, which is the same as the imaging region (distance measurement region) of the imaging unit 14.

The imaging unit 14 is constituted of an imaging lens 14A and an image sensor 14B. The imaging lens 14A images reflected light (a light image including the first dot pattern projected from the projection unit 12 and reflected from the subject) from the subject on the image sensor 14B.

The image sensor 14B is constituted of a complementary metal-oxide semiconductor (CMOS) driver which has a vertical driver, a horizontal driver, and the like, and a CMOS type image sensor which is driven by a timing generator. The image sensor 14B is not limited to a CMOS type, and may be an XY address type or charge coupled device (CCD) type image sensor.

The image sensor 14B has a plurality of light receiving elements (photodiodes) arranged in a two-dimensional manner, and is provided with, on an incidence surface of a plurality of light receiving elements, a band-pass filter which transmits only a wavelength range of the first dot pattern of near infrared light projected from the projection unit 12 or a visible light cut filter which eliminates visible light. With this, a plurality of light receiving elements of the image sensor 14B function as pixels having sensitivity to near infrared light. That is, the imaging unit 14 of this embodiment images the subject in the invisible wavelength range (in this example, a wavelength range of near infrared light).

In the image sensor 14B, an exposure period is controlled according to a timing signal (shutter control signal) applied from the timing generator (not shown), and electric charge corresponding to the amount of near infrared light entering in the exposure period is accumulated in each light receiving element of the image sensor 14B. Then, a pixel signal (an analog signal corresponding to electric charge accumulated in each pixel) according to the amount of incident light of the first dot pattern reflected from the subject is read from the image sensor 14B. In a case where the subject is irradiated with ambient light and a component in the wavelength range of near infrared light is included in ambient light, the component in the wavelength range of near infrared light out of ambient light is included in a signal of the captured image as a noise signal. Meanwhile, in an environment in which a component in the wavelength range of near infrared light is not almost included in ambient light, the component in the wavelength range of near infrared light of ambient light included in the signal of the captured image is small to be negligible compared to a component of a projected dot pattern.

The analog signal read from the image sensor 14B is converted to a digital signal (image data) by the AD converter 16, and is loaded on the CPU 20 by way of the interface circuit 18 functioning as an image input controller. A CMOS type image sensor may include an AD converter, and in this case, the AD converter 16 may be omitted.

The CPU 20 has a function as a device control unit which integrally controls the respective units, such as the drive unit 26 (the projection drive unit 26A and the imaging drive unit 26B), the communication unit 30, and the storage unit 32, according to an instruction input on the operating unit 28.

The CPU 20 has functions as a projection control unit 20A which performs control through the projection drive unit 26A such that the projection unit 12 performs a plurality of times of light emission with a plurality of light emission intensities to project the first dot pattern onto the subject within the distance measurement region, an imaging control unit 20B which performs control through the imaging drive unit 26B such that the imaging unit 14 images the subject in synchronization with each of a plurality of times of light emission of the projection unit 12 and generates a plurality of captured images including the first dot pattern reflected from the subject and corresponding to a plurality of light emission intensities, a pattern extraction unit 20C which extracts a dot pattern from multi-value image data of the captured images or the like, a normalization unit 20D which normalizes a plurality of captured images with coefficients corresponding to a plurality of light emission intensities to acquire a plurality of normalized images, a position correction unit 20E which corrects displacement in pixel positions of a plurality of normalized images, a discrimination unit 20F which compares a plurality of normalized images after displacement in pixel positions is corrected by the position correction unit 20E, and discriminates the first dot pattern projected from the projection unit 12, a noise elimination unit 20G which selects the first dot pattern by eliminating a dot pattern (hereinafter, referred to as a "second dot pattern") of structured light projected from another distance image acquisition apparatus from the dot pattern extracted by the pattern extraction unit 20C based on a result of the discrimination of the discrimination unit 20F, a pattern comparison unit 20H which compares the number of dots (hereinafter, referred to as "the number of projected dots") of the first dot pattern projected from the projection unit 12 with the number of dots (hereinafter, referred to as "the number of discriminated dots") of the first dot pattern extracted by the pattern extraction unit 20C and selected based on the result of the discrimination of the discrimination unit 20F, and a distance image acquisition unit 20J which acquires a distance image indicating a distance of the subject based on the first dot pattern extracted by the pattern extraction unit 20C and selected based on the result of the discrimination unit 20F.

The projection control unit 20A makes the light emission intensity different in at least one time of light emission among a plurality of times of light emission. In a case where light emission is performed two times, the light emission intensity is made different in a first light emission and a second light emission. Hereinafter, such control for modulating the light emission intensity of the first dot pattern projected from the projection unit 12 may be simply referred to as "intensity modulation". The projection control unit 20A shown in FIG. 3 performs the intensity modulation by controlling the projection drive unit 26A which drives the projection unit 12; however, the invention is not limited to such a case. For example, the intensity modulation may be performed on light emitted from a near infrared LED 12A as a light source. The "light emission intensity" in the invention means the light emission intensity of the first dot pattern actually projected from the projection unit 12, that is, the intensity of light actually projected onto the subject. In an aspect in which the intensity modulation is performed on light emitted from the light source, the "light emission intensity" indicates the intensity of light after the intensity modulation, not the intensity of light when light is emitted from the light source (that is, before the intensity modulation).

The imaging control unit 20B controls the imaging unit 14 through the imaging drive unit 26B such that the imaging unit 14 performs exposure in an exposure period corresponding to a frame rate of the distance image. The projection control unit 20A controls the projection unit 12 through the projection drive unit 26A such that the projection unit 12 projects the first dot pattern in synchronization with start and end timings of the exposure period of the imaging unit 14. That is, it is possible to acquire the distance image as video having a given frame rate.

The pattern extraction unit 20C extracts a dot pattern from at least one captured image among a plurality of captured images (that is, a plurality of captured images before normalization) as image data input through the interface circuit 18. A dot pattern may be extracted from at least one normalized image among a plurality of normalized images which are a plurality of captured images normalized by the normalization unit 20D described below. For example, an appropriate threshold for dot pattern extraction is set, and binarization processing is performed on the captured image or the normalized image (multi-value image data) based on the threshold, thereby extracting binary image data indicating only the dot pattern. That is, binary image data indicating only the dot pattern is acquired from multi-value image data including the dot pattern. In a case where the host apparatus and the another apparatus project the dot patterns onto the same subject simultaneously, the first dot pattern and the second dot pattern having the same shape as the first dot pattern are mixedly extracted. "Extracting a dot pattern" in the invention is not limited to a case where a dot pattern is acquired as binary image data. In summary, the pattern extraction unit 20C extracts information indicating the dot patterns included in the captured image before normalization and the captured image after normalization. There may be a case where only information indicating a position of each dot pattern in an image is acquired, and this case is also included in the invention.

The normalization unit 20D normalizes the magnitude of a pixel value of a captured image with a coefficient corresponding to the light emission intensity of the first dot pattern at the time of imaging the captured image, thereby acquiring a normalized image. While the magnitude of the pixel value of the pixel indicating the first dot pattern in the captured image before normalization changes corresponding to the magnitude of the light emission intensity, in a case of a subject that is at an approximate distance from the distance image acquisition apparatus and having reflectance similar to wavelength light of the projected dot pattern, the pixel value of the pixel indicating the first dot pattern in the normalized image as the captured image after normalization becomes a substantially constant value (in other words, a value within a tolerance range regardless of the magnitude of the light emission intensity).

The position correction unit 20E detects a correspondence relationship of pixel positions of a plurality of normalized images (the captured images with the normalized pixel values) and corrects displacement in pixel positions of a plurality of normalized images based on a result of the detection of the correspondence relationship. In other words, the position correction unit 20E normalizes the pixel positions of a plurality of normalized images.

The discrimination unit 20F calculates the difference of the pixel values of a plurality of normalized images at the corresponding pixel positions of a plurality of normalized images and discriminates pixels having an absolute value of the difference of the pixel values equal to or less than a threshold as pixels indicating the first dot pattern projected from the host apparatus, for example. However, the invention is not particularly limited to such a case. For example, the ratio of the pixel values of a plurality of normalized images may be calculated at the corresponding pixel positions of a plurality of normalized images, and pixels having the ratio of the pixel values within a set range of an upper limit value and a lower limit value may be discriminated to be pixels indicating the first dot pattern projected from the host apparatus. The invention is not limited to a case of performing the discrimination in units of pixels. For example, the discrimination may be performed in units of dots.

The noise elimination unit 20G has a function of eliminating the second dot pattern from the dot pattern (including the second dot pattern projected from the another apparatus) extracted by the pattern extraction unit 20C based on the result of the discrimination of the discrimination unit 20F. The noise elimination unit 20G may have a function of eliminating noise from multi-value image data, such as the captured image and the normalized image.

The expression "extracted dot pattern" in the invention is not limited to binary image data as described above. For example, in a case where only information indicating the position of the dot pattern in the image is acquired by the pattern extraction unit 20C, information indicating the position of the second dot pattern is deleted from the acquired information.

The pattern comparison unit 20H compares the number of projected dots as the number of dots of the first dot pattern actually projected from the projection unit 12 with the number of dots (hereinafter, referred to as "the number of discriminated dots) of the dot pattern after the second dot pattern is eliminated based on the result of the discrimination of the discrimination unit 20F by the noise elimination unit 20G. The comparison enables determination regarding whether or not a component of the second dot pattern projected from the another apparatus remains in the pattern (for example, binary image data) yet after the elimination processing of the second dot pattern is performed by the noise elimination unit 20G. That is, the pattern comparison unit 20H checks whether or not only the first dot pattern is correctly selected from the dot pattern extracted by the pattern extraction unit 20C. It can be said that "the number of discriminated dots" is the number of dots of the pattern discriminated to be the first dot pattern by the discrimination unit 20F.

The distance image acquisition unit 20J acquires (generates) the distance image indicating the distance of the subject within the distance measurement region based on the dot pattern (that is, the first dot pattern projected from the host apparatus) which remains after the second dot pattern projected from the another apparatus is eliminated by the noise elimination unit 20G. For example, the position (for example, the position of the center of gravity of each dot) of each dot of the first dot pattern on the image sensor 14B is obtained based on binary image data only indicating the first dot pattern, the distance of the subject for each dot is calculated based on the obtained position of each dot of the first dot pattern on the image sensor 14B, and thus, the distance image indicating the distance of the subject within the distance measurement region is acquired (generated). While the distance image is two-dimensional distance information indicating the distance of the subject within the distance measurement region, the distance image can be visually recognized as an image by substituting the distance information with a brightness value or color information corresponding to the distance.

In summary, the distance image acquisition unit 20J acquires the distance image indicating the distance of the subject based on the result of the discrimination of the discrimination unit 20F.

The drive unit 26 includes the projection drive unit 26A which drives the projection unit 12, and the imaging drive unit 26B which drives the imaging unit 14. The projection drive unit 26A drives the projection unit 12 according to an instruction from the CPU 20. The imaging drive unit 26B drives the imaging unit 14 according to an instruction from the CPU 20.

The operating unit 28 includes a power switch, a shutter button 11, a mode selection unit, and the like, and an instruction input on the operating unit 28 is applied to the CPU 20.

The communication unit 30 is a short-distance wireless communication unit which performs wireless communication with another apparatus or an access point, and functions as a beacon information reception unit which receives beacon information transmitted from the another apparatus directly or through the access point.

The storage unit 32 stores a program which is executed by the CPU 20, and various kinds of information necessary for the execution of the program. The storage unit 32 also stores multi-value image data indicating the captured image output from the interface circuit 18, multi-value image data indicating the normalized image as the captured image after normalization, binary image data indicating the extracted dot pattern, and data of the distance image.

Figure 4:
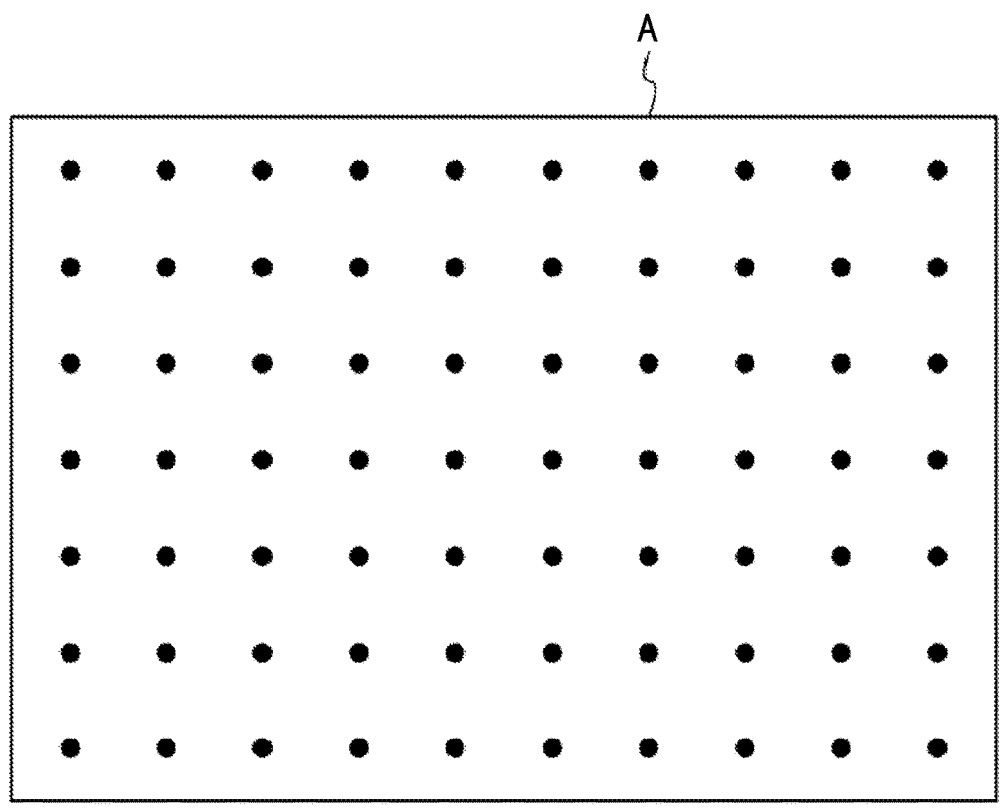
FIG. 4 is a diagram showing an example of a captured image obtained by imaging in a state in which a dot pattern is not projected from another apparatus when a dot pattern is projected from a host apparatus.
Figure 5:
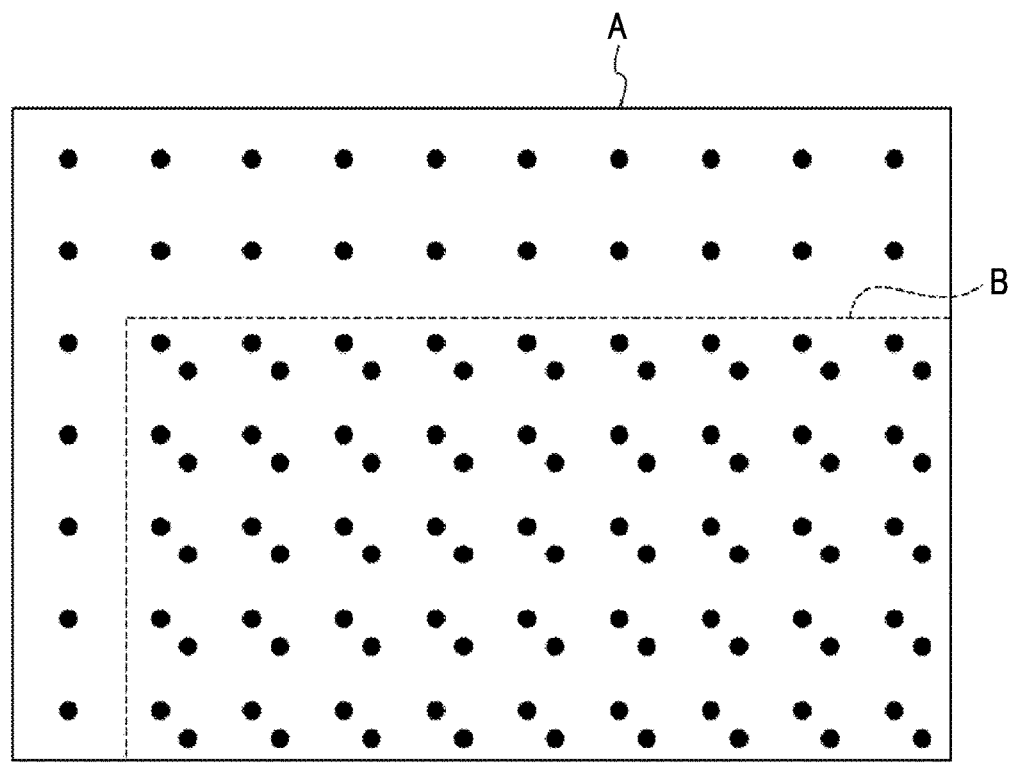
FIG. 5 is a diagram showing an example of a captured image obtained by imaging in a state in which a dot pattern is projected from the another apparatus when a dot pattern is projected from the host apparatus.

FIG. 4 is a diagram showing an example of a captured image obtained by imaging with the imaging unit 14 in a state in which a second dot pattern (referred to as a "second pattern") is not projected from the another apparatus when a first dot pattern (referred to as a "first pattern") is projected from the host apparatus. Since the captured image shown in FIG. 4 includes only the first dot pattern projected from the projection unit 12 of the host apparatus and reflected from a subject within a distance measurement region A, it is possible to extract the first dot pattern through simple image processing, such as binarization processing using a threshold. However, in a case where the second dot pattern is projected from the another apparatus equivalent or similar to the host apparatus when the first dot pattern is projected from the host apparatus, as shown in FIG. 5, since an overlap region B where the first dot pattern and the second dot pattern overlap each other is present within the distance measurement region A of the captured image obtained by imaging with the imaging unit 14, and the first dot pattern and the second dot pattern have the same dot shape, in the related art, it is difficult to extract the first dot pattern from the captured image. Since the host apparatus and the another apparatus are independent distance image acquisition apparatuses, it is difficult to control a timing of pattern projection from the CPU 20 of the host apparatus to the projection unit of the another apparatus.

Hereinafter, a first embodiment of a distance image acquisition method which, even in a case where the host apparatus and the another apparatus project dot patterns having the same shape onto the same subject simultaneously, is capable of discriminating the first dot pattern projected from the host apparatus from the second dot pattern and acquiring the distance image with high accuracy based on only the first dot pattern will be described referring to FIGS. 6 to 10.

Figure 6:
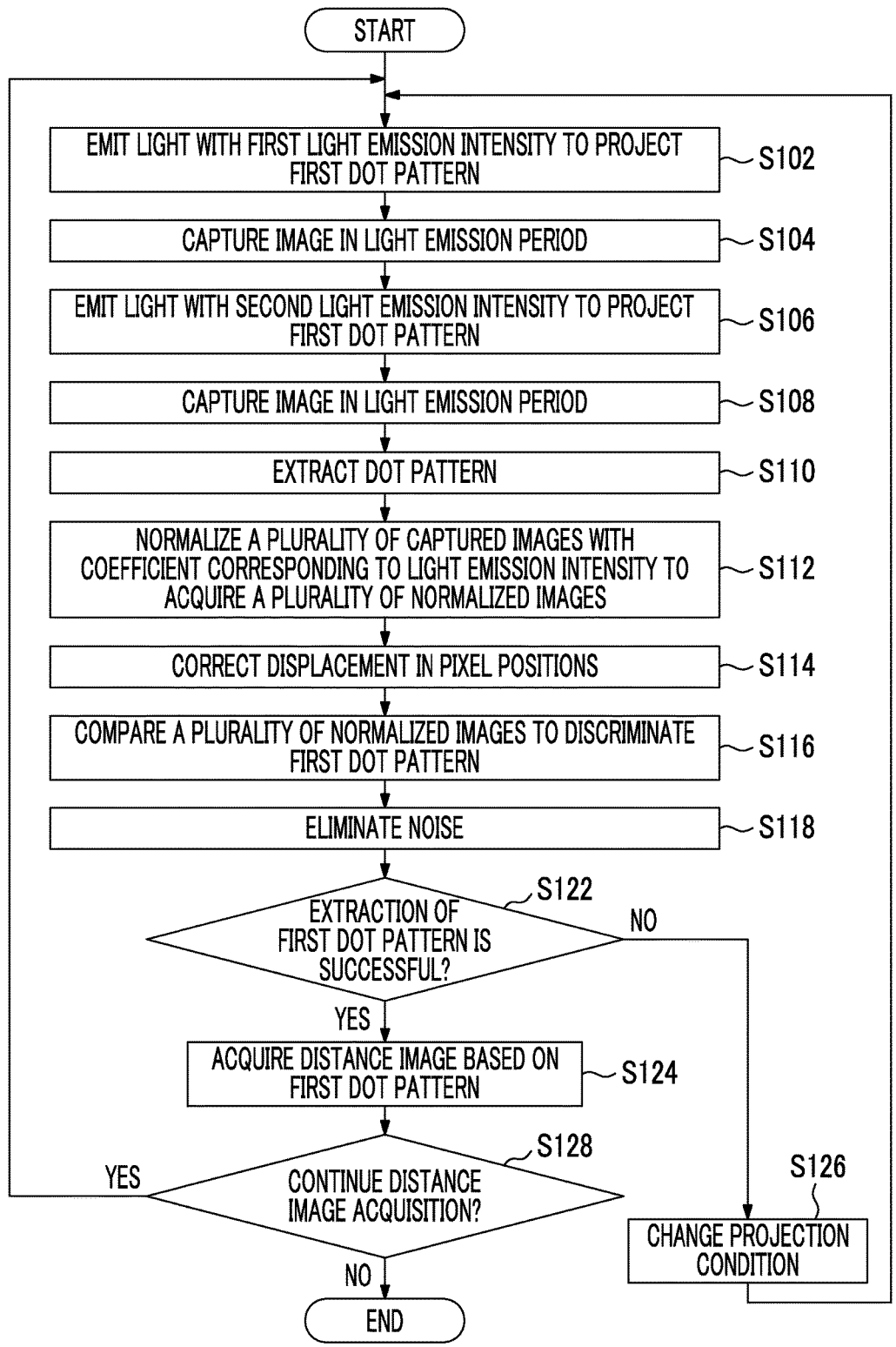
FIG. 6 is a flowchart showing a flow of processing for an example of a distance image acquisition method in the first embodiment.

FIG. 6 is a flowchart showing a flow of processing of an example of the distance image acquisition method in the first embodiment, and shows a flow of processing that is primarily performed according to a program under the control of the CPU 20. This processing is distance image acquisition processing in a video mode, and for example, starts in a case where the shutter button 11 is operated with one push.

First, the projection control unit 20A controls the projection unit 12 through the projection drive unit 26A such that the projection unit 12 performs first light emission with a first light emission intensity to project a first dot pattern distributed in a two-dimensional manner with respect to a subject within a distance measurement region (Step S102). The imaging control unit 20B controls the imaging unit 14 through the imaging drive unit 26B such that the imaging unit 14 images the subject within the distance measurement region in synchronization with the first light emission of the projection unit 12 (Step S104). A first captured image which is a captured image including the first dot pattern reflected from the subject and generated by imaging the subject in a first light emission period is output from the interface circuit 18. Each pixel constituting the first dot pattern in the first captured image has a pixel value corresponding to the first light emission intensity.

Next, the projection control unit 20A controls the projection unit 12 through the projection drive unit 26A such that the projection unit 12 performs second light emission with a second light emission intensity different from the first light emission intensity to project the first dot pattern distributed in a two-dimensional manner with respect to the subject within the distance measurement region (Step S106). In a case where the imaging unit 14 performs exposure for a given time on reflected light of the dot pattern emitted from the projection unit 12 and electric charge is accumulated, the term "light emission intensity" is a broad concept including an integrated value of light emission intensity over a time corresponding to the given time (exposure time). Accordingly, it should be noted that the "light emission intensity" in the invention may be changed even by changing a light emission time (projection time) without changing light intensity of the dot pattern emitted from the projection unit 12. The imaging control unit 20B controls the imaging unit 14 through the imaging drive unit 26B such that the imaging unit 14 images the subject within the distance measurement region in synchronization with the second light emission of the projection unit 12 (Step S108). A second captured image which is a captured image including the first dot pattern reflected from the subject and generated by imaging the subject in a second light emission period is output from the interface circuit 18. Each pixel constituting the first dot pattern in the second captured image has a pixel value corresponding to the second light emission intensity.

The imaging unit 14 of this example outputs an analog imaging signal having a signal value corresponding to the amount of stored electric charge read from a light receiving element as a captured image. The analog imaging signal is converted to a digital imaging signal by the AD converter 16, and the digital imaging signal is stored in the storage unit 32 as a captured image of digital data by the interface circuit 18.

Next, a dot pattern is extracted from at least one captured image of the first captured image and the second captured image by the pattern extraction unit 20C (Step S110).

Figure 8:
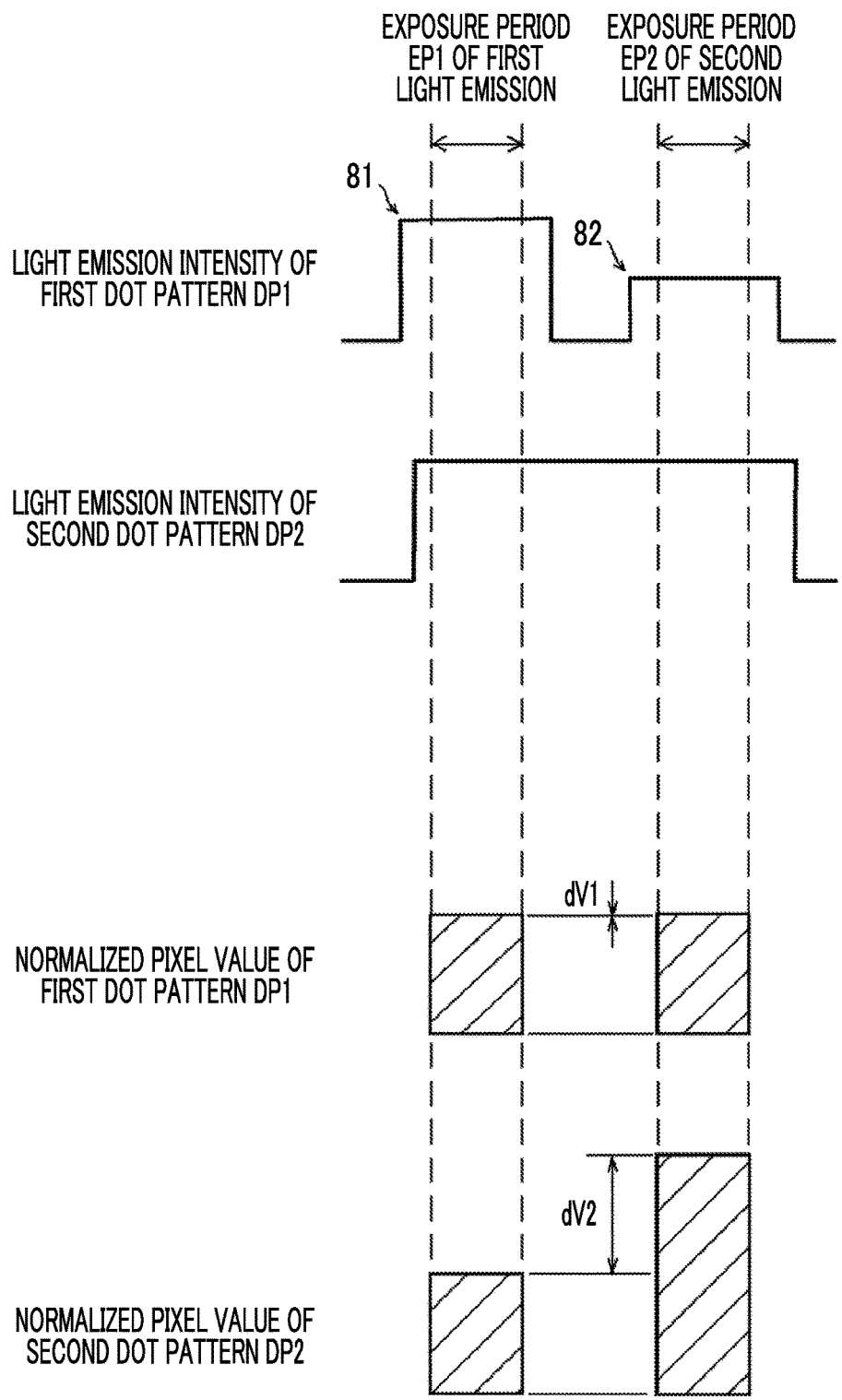
FIG. 8 is a first explanatory view illustrating intensity modulation and normalization in the first embodiment.
Figure 9:
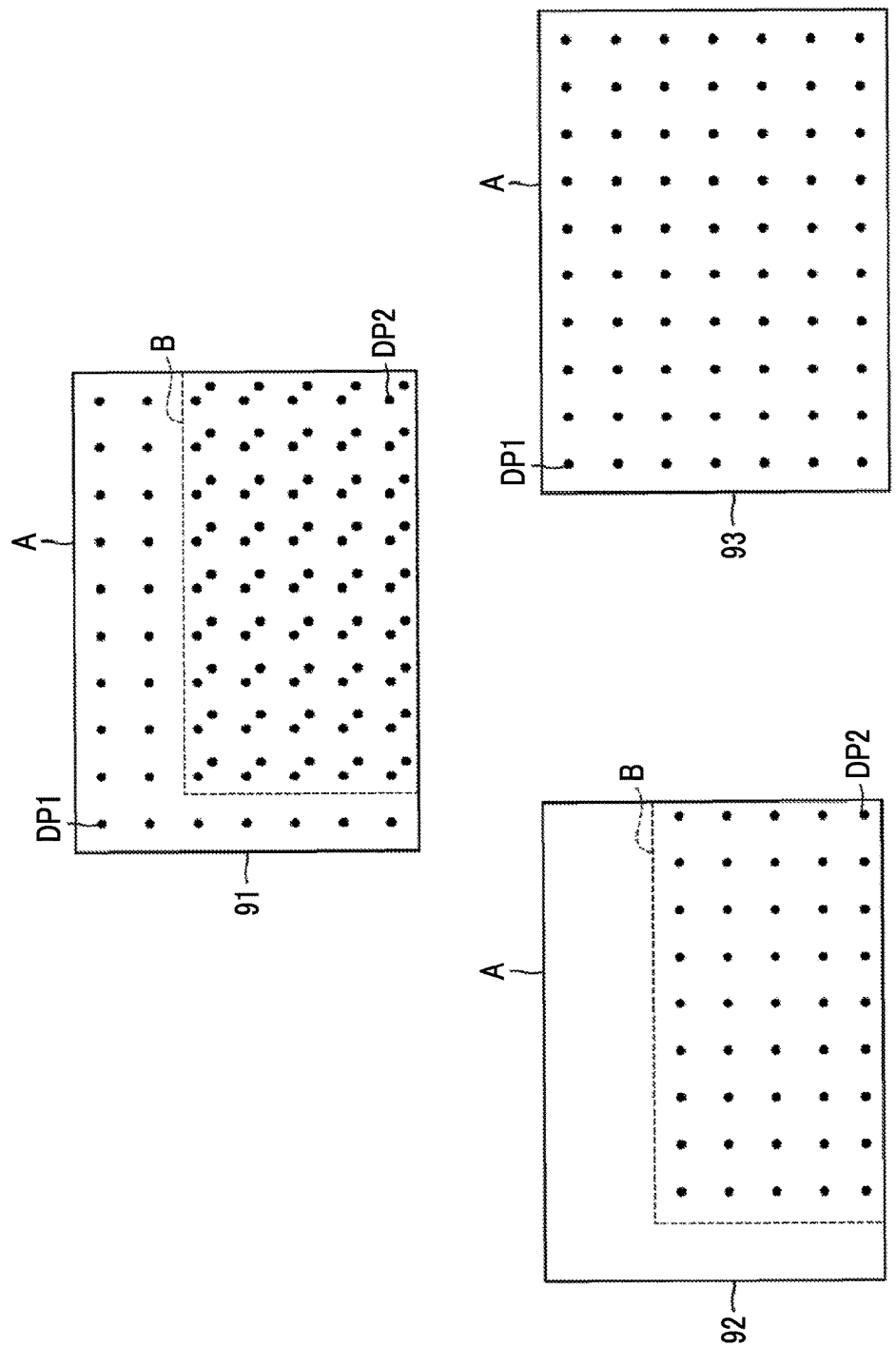
FIG. 9 is an explanatory view illustrating noise elimination in the first embodiment.

It is assumed that a first dot pattern (DP1 of FIG. 7) is projected from the projection unit of the host apparatus onto the subject, and a second dot pattern (DP2 of FIG. 7) having the same shape as the first dot pattern is projected from the another apparatus. As shown in FIG. 8, it is assumed that the second dot pattern DP2 is projected from the another apparatus with a given light emission intensity in an exposure period EP1 of the imaging unit 14 corresponding to first light emission 81 of the projection unit 12 and an exposure period EP2 of the imaging unit 14 corresponding to second light emission 82 of the projection unit 12. When this happens, even if a dot pattern is extracted from one of the first captured image and the second captured image, as shown in FIG. 9, the first dot pattern DP1 and the second dot pattern DP2 are included in a dot pattern 91 which is binary image data output from the pattern extraction unit 20C.

Next, the first captured image and the second captured image are normalized with coefficients corresponding to the first light emission intensity and the second light emission intensity by the normalization unit 20D, and a first normalized image and a second normalized image are acquired (Step S112).

In a case where intensity modulation shown in FIG. 8 is performed, the normalization unit 20D normalizes the first captured image obtained by imaging in the exposure period EP1 corresponding to the first light emission 81 with a coefficient k1 corresponding to the light emission intensity of the first light emission 81, and normalizes the second captured image obtained by imaging in the exposure period EP2 corresponding to the second light emission 82 with a coefficient k2 corresponding to the light emission intensity of the second light emission 82. For example, each pixel value of the first captured image is multiplied by a reciprocal of the coefficient k1, and each pixel value of the second captured image is multiplied by a reciprocal of the coefficient k2. In the example of FIG. 8, normalization is performed based on the light emission intensity of the first light emission 81, and an arithmetic operation to the first captured image is omitted. In this example, k1=1, and the first captured image and the first normalized image are identical.

Next, the correspondence relationship between the pixel position of the first normalized image and the pixel position of the second normalized image is detected and displacement in pixel positions of the first normalized image and the second normalized image is corrected by the position correction unit 20E (Step S114). That is, even in a case where displacement in pixel positions occurs due to displacement or the like of the distance image acquisition apparatus 10 between the first exposure period and the second exposure period, displacement in the pixel position of the first normalized image and the pixel position of the second normalized image is corrected.

Next, the first normalized image and the second normalized image are compared and the first dot pattern projected from the projection unit 12 is discriminated by the discrimination unit 20F (Step S116). That is, pixels which are pixels indicating the first dot pattern among the pixels in the first normalized image and the second normalized image are discriminated, whereby discrimination is made which dot pattern of the dot patterns DP1 and DP2 in the dot pattern 91 output from the pattern extraction unit 20C is the first dot pattern DP1.

The discrimination unit 20F of this example calculates the difference between the pixel values at the corresponding pixel positions of the first normalized image and the second normalized image and discriminates pixels having an absolute value of the difference between the pixel values equal to or less than a threshold to be pixels indicating the first dot pattern DP1 projected from the host apparatus. For example, in a case where the intensity modulation shown in FIG. 8 is performed, in the pixels constituting the first dot pattern DP1, the difference dV1 between the pixel values of the first normalized image and the second normalized image becomes zero or a value close to zero (that is, a value equal to or less than the threshold), and in the pixels constituting the second dot pattern DP2, the difference dV2 between the pixel values of the first normalized image and the second normalized image becomes a value greater than the threshold. The ratio of the pixel values at the corresponding pixel positions of the first normalized image and the second normalized image may be calculated, and pixels having the ratio of the pixel values within a range of an upper limit value and a lower limit value may be discriminated to be the pixels indicating the first dot pattern DP1 projected from the host apparatus. That is, using the fact that the host apparatus knows change in light emission intensity of the first dot pattern projected from the host apparatus, the discrimination unit 20F reliably discriminates the first dot pattern even if the second dot pattern is projected from the another apparatus.

Next, the second dot pattern DP2 is eliminated from the dot pattern 91 extracted by the pattern extraction unit 20C based on the result of the discrimination of the discrimination unit 20F by the noise elimination unit 20G (Step S118). As shown in FIG. 9, the noise elimination processing corresponds to processing for subtracting a binary image 92 of a dot pattern including only the second dot pattern DP2 from a binary image 91 of a dot pattern with the first dot pattern and the second dot pattern mixed and acquiring a binary image 93 of a dot pattern including only the first dot pattern DP1.

Next, the number of dots (the number of projected dots) of the first dot pattern projected from the projection unit 12 of the host apparatus is compared with the number of dots (the number of discriminated dots) of the dot pattern, which is extracted by the pattern extraction unit 20C and remains after the second dot pattern is eliminated by the noise elimination unit 20G, by the pattern comparison unit 20H, thereby determining whether or not the extraction of the first dot pattern is successful (S122). For example, determination is made that pattern discrimination fails in a case where the number of discriminated dots exceeds the number of projected dots, and determination is made that pattern discrimination is successful in a case where the number of discriminated dots is equal to or less than the number of projected dots.

Usually, since only the first dot pattern is discriminated normally by the discrimination of the discrimination unit 20F, all of the second dot patterns are eliminated based on the result of the discrimination by the noise elimination unit 20G, and determination is made by the pattern comparison unit 20H that pattern extraction is successful (YES in Step S122). In a case where the determination in Step S122 is YES, a distance image is acquired from the first dot pattern, which remains after the second dot pattern is eliminated by the noise elimination unit 20G, by the distance image acquisition unit 20J (Step S124).

In a case where determination is made by the pattern comparison unit 20H that pattern discrimination fails (in a case where the determination in Step S122 is NO), a projection condition of the first dot pattern in the projection unit 12 is changed by the projection control unit 20A (Step S126), and Steps S102 to S122 are repeated.

The CPU 20 determines whether or not to continue the distance image acquisition (Step S128), and in a case where determination is made to continue the distance image acquisition (in a case where the determination in Step S128 is YES), Steps S102 to S124 are repeated without changing the projection condition. In a case where determination is made not to continue the distance image acquisition (in a case where the determination in Step S128 is NO), this processing ends. This processing is the distance image acquisition in the video mode, and ends in a case where the shutter button 11 is operated with one push again.

Usually, since only the first dot pattern is discriminated normally in Step S116, and the determination in Step S122 is YES (pattern discrimination is successful), in a case where the invention is not carried out with a simple configuration, error processing may be performed instead of changing the projection condition (Step S126) and this processing may end, or the process may be returned to Step S102 after a standby for a given time in order to wait for the projection end of the second dot pattern.

Figure 10:
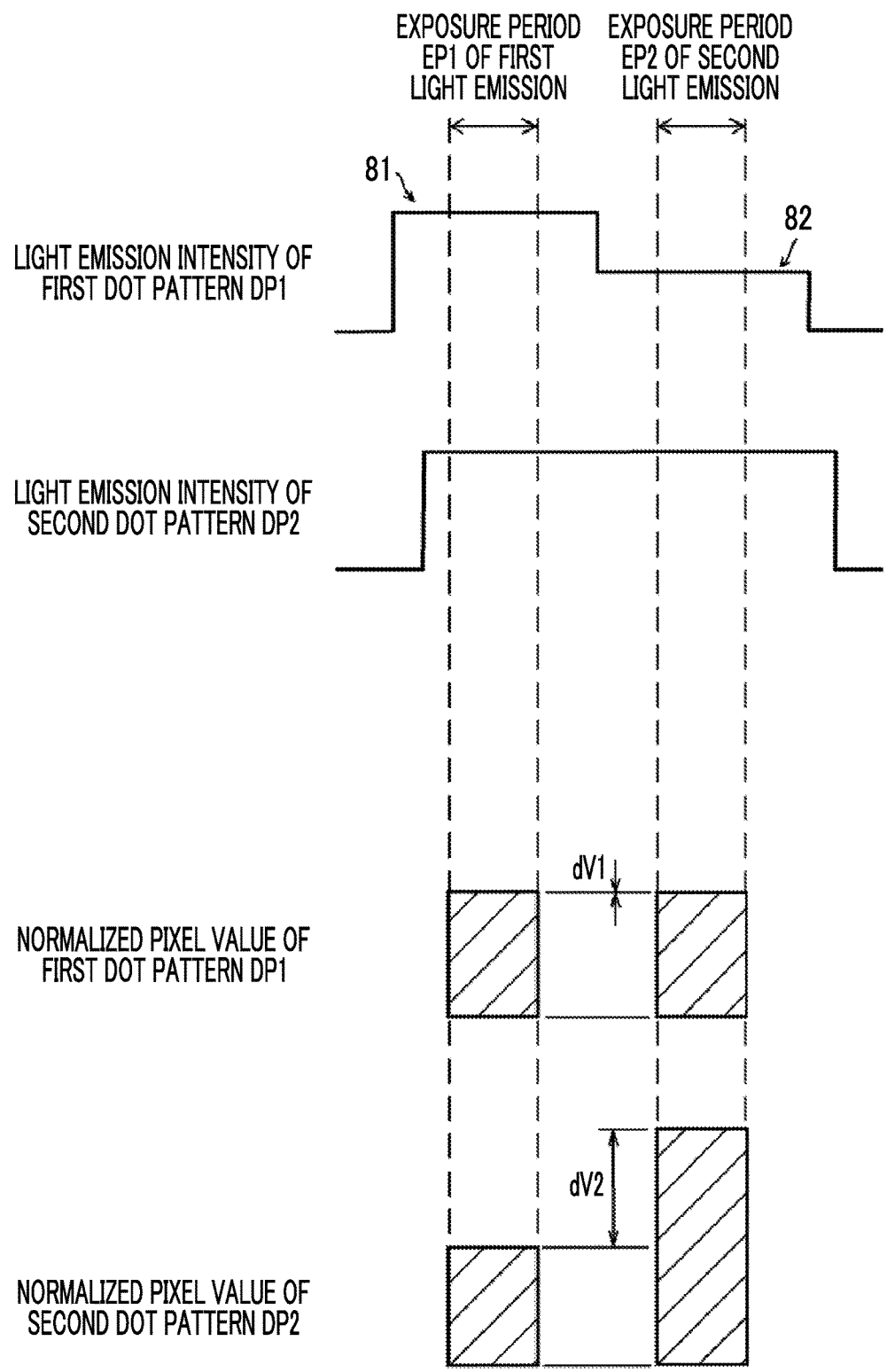
FIG. 10 is a second explanatory view illustrating intensity modulation and normalization in the first embodiment.

On the other hand, in FIG. 8, for ease of understanding of the invention, although a case where a non-light emission period is provided between the first light emission 81 and the second light emission 82 has been illustrated as an example, as shown in FIG. 10, a non-light emission period may not be provided between the first light emission 81 and the second light emission 82, and the first light emission 81 and the second light emission 82 may be performed continuously. Although a case where discrimination is performed with two times of light emission has been described as an example, a case where discrimination is performed with three times or more of light emission is also included in the invention.

Although a case where the dot pattern is extracted in binary image data from the captured image (multi-value image data), and the component of the second dot pattern is eliminated from the extracted dot pattern based on the result of the discrimination of the discrimination unit 20F has been described referring to the flowchart of FIG. 6 as an example, the invention is not limited to such a case. The component of the second dot pattern may be eliminated from the captured image (multi-value image data) based on the result of the discrimination of the discrimination unit 20F, and the first dot pattern may be extracted in binary image data from the captured image with the component of the second dot pattern eliminated. The dot pattern may be extracted in binary image data from the captured image (normalized image) after normalization. A case where a dot pattern is extracted in a multi-value image is also included in the invention.

Although a case where the noise elimination unit 20G is provided in the distance image acquisition apparatus 10 has been described as an example, the invention is not limited to such a case. In a case where the second dot pattern projected from the another apparatus is not eliminated from the dot pattern extracted by the pattern extraction unit 20C, that is, in a case where the distance image is acquired directly from the discrimination result (including information indicating whether or not each of a plurality of dot patterns extracted by the pattern extraction unit 20C is the first dot pattern projected from the host apparatus) of the discrimination unit 20F, the noise elimination unit 20G can be omitted.

Although a case where the position correction unit 20E is provided in the distance image acquisition apparatus 10 has been described as an example, the invention is not limited to such a case. In a case where it is assumed that the main body of the distance image acquisition apparatus 10 is fixed for use, that is, in a case where the distance image acquisition apparatus 10 is used only in an environment in which no positional displacement occurs among a plurality of captured images, the position correction unit 20E can be omitted.

Second Embodiment

The internal configuration of a distance image acquisition apparatus 10 of a second embodiment will be described referring to FIG. 3. Hereinafter, a difference from the first embodiment will be primarily described, and the contents already described in the first embodiment will not be repeated.

The imaging control unit 20B of this embodiment performs control through the imaging drive unit 26B such that the imaging unit 14 performs imaging in synchronization with each of a plurality of light emission periods with different light emission intensities of the projection unit 12 to perform imaging multiple times, and performs at least one time of imaging in a non-light emission period of the projection unit 12.

The noise elimination unit 20G of this embodiment has a function of eliminating noise, such as background light, from the captured image before normalization, in addition to a function of eliminating the second dot pattern projected from the another apparatus from the dot pattern described in the first embodiment. That is, the noise elimination unit 20G of this embodiment subtracts the captured image (the captured image in the non-light emission period) generated by imaging with the imaging unit 14 in the non-light emission period of the projection unit 12 from each of a plurality of captured images (the captured images in the light emission periods) generated by imaging with the imaging unit 14 in the light emission periods of the projection unit 12.

Figure 12:
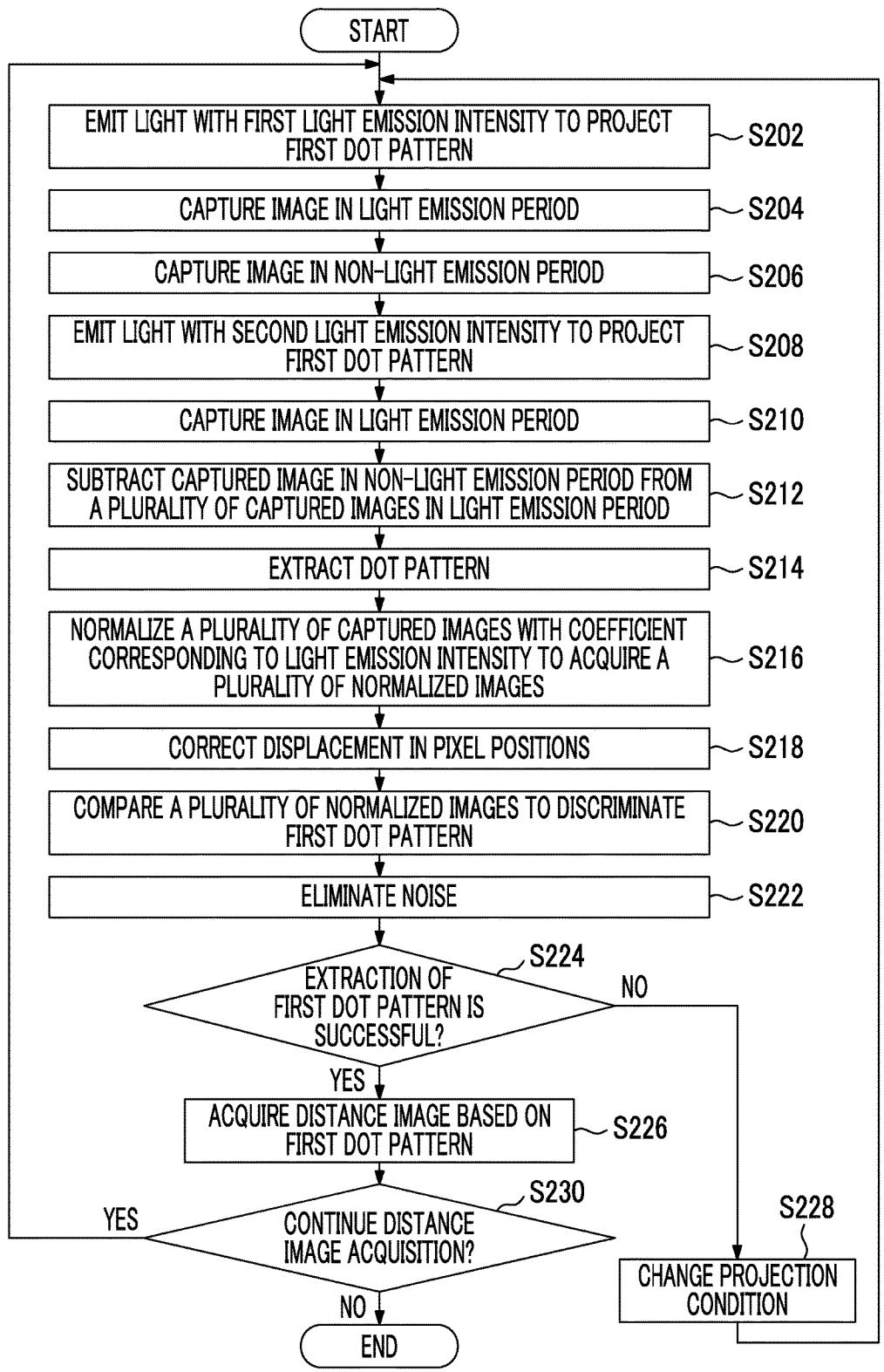
FIG. 12 is a flowchart showing a flow of processing for an example of a distance image acquisition method in the second embodiment.

FIG. 12 is a flowchart showing a flow of processing of an example of a distance image acquisition method of the second embodiment, and shows a flow of processing that is primarily performed according to the program under the control of the CPU 20. This processing is distance image acquisition processing in the video mode, and for example, starts in a case where the shutter button 11 is operated with one push.

Figure 11:
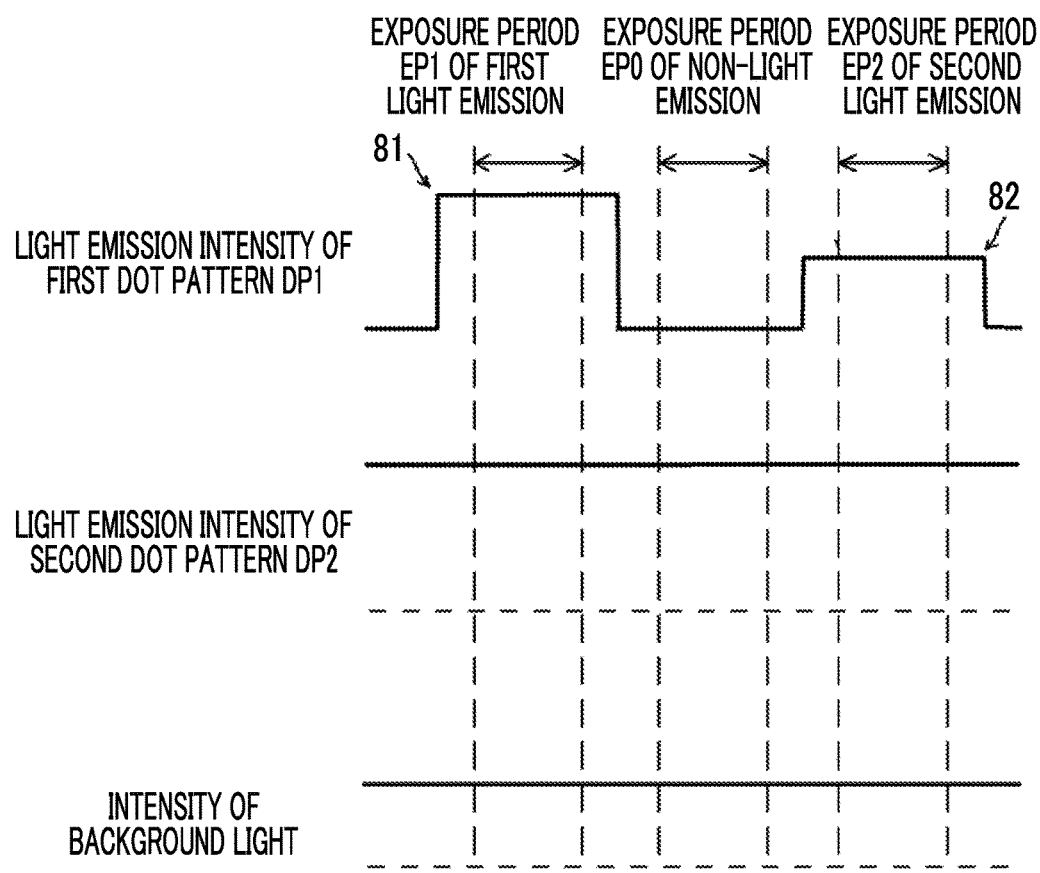
FIG. 11 is an explanatory view illustrating intensity modulation and normalization in a second embodiment.

Steps S202 and S204 are the same as Steps S102 and S104 of the first embodiment shown in FIG. 6, and projection and imaging are performed in a light emission period of first light emission of the projection unit 12. A captured image (hereinafter, referred to as "a captured image in a first light emission period") obtained by imaging in an exposure period EP1 of the first light emission 81 shown in FIG. 11 is output from the interface circuit 18. The first dot pattern projected from the host apparatus is included in the captured image in the first light emission period.

In this example, as shown in FIG. 11, the subject within the distance measurement region is imaged by the imaging unit 14 in a non-light emission period between the first light emission 81 and second light emission 82 (Step S206). A captured image (hereinafter, referred to as "a captured image in a non-light emission period") obtained by imaging in an exposure period EP0 of non-light emission shown in FIG. 11 is output from the interface circuit 18. The first dot pattern projected from the host apparatus is not included in the captured image in the non-light emission period.

Steps S208 and S210 are the same as Steps S106 and S108 of the first embodiment shown in FIG. 6, and projection and imaging are performed in a light emission period of the second light emission 82 of the projection unit 12. A captured image (hereinafter, referred to as "a captured image in a second light emission period") obtained by imaging in an exposure period EP2 of the second light emission 82 shown in FIG. 11 is output from the interface circuit 18. The first dot pattern projected from the host apparatus is included in the captured image in the second light emission period.

Next, the captured image in the non-light emission period is subtracted from the captured image of the first light emission period and the captured image in the non-light emission period is subtracted from the captured image of the second light emission period by the noise elimination unit 20G (Step S212). That is, in a case where disturbance noise with the same light emission intensity in the exposure period EP1 of the first light emission 81 and the exposure period EP2 of the second light emission 82 is in the captured image, disturbance noise is eliminated from the captured image before normalization processing (Step S216) described below.

Step S214 is the same as Step S110 of the first embodiment shown in FIG. 6.

Next, an image obtained by subtracting the captured image in the non-light emission period from the captured image of the first light emission period and an image obtained by subtracting the captured image in the non-light emission period from the captured image of the second light emission period are normalized with coefficients corresponding to a first light emission intensity and a second light emission intensity by the normalization unit 20D, and a first normalized image and a second normalized image are acquired (Step S216).

Steps S218 to S222 are the same as Steps S114 to S118 of the first embodiment shown in FIG. 6. Steps S224 to S230 are the same as Steps S122 to S128 of the first embodiment shown in FIG. 6.

In FIG. 11, a case where the light emission intensity of the second dot pattern DP2 projected from the another apparatus is constant in the exposure periods EP1 and EP2 during which the host apparatus emits light and the exposure period EP0 during which the host apparatus does not emit light has been described as an example. In such a case, the second dot pattern is eliminated by the processing for subtracting the captured image in the non-light emission period (Step S212). Meanwhile, in a case where light emission of the second dot pattern DP2 is synchronized with the light emission timing of the first dot pattern DP1, that is, in a case where the light emission intensity of the second dot pattern DP2 is zero in the exposure period EP0 during which the host apparatus does not emit light, the second dot pattern is eliminated in Step S222. Although a case where imaging is performed in the non-light emission period between the first light emission and the second light emission has been described referring to FIG. 11 as an example, the invention is not limited to such a case. An image obtained by imaging in a non-light emission period before the first light emission may be subtracted from the captured image in the light emission period, or an image obtained by imaging in a non-light emission period after the second light emission may be subtracted from the captured image in the light emission period.

Third Embodiment

In the first embodiment and the second embodiment, for ease of understanding of the invention, although a case where intensity modulation is performed regardless of the presence or absence of projection of the second dot pattern from the another apparatus has been described as an example, the invention is not limited to such a case. In a third embodiment, when the second dot pattern is not projected from the another apparatus, distance image acquisition is performed without performing intensity modulation.

The internal configuration of a distance image acquisition apparatus 100 of the third embodiment will be described referring to FIG. 13. Hereinafter, the contents already described in the first embodiment and the second embodiment will not be repeated.

Figure 13:
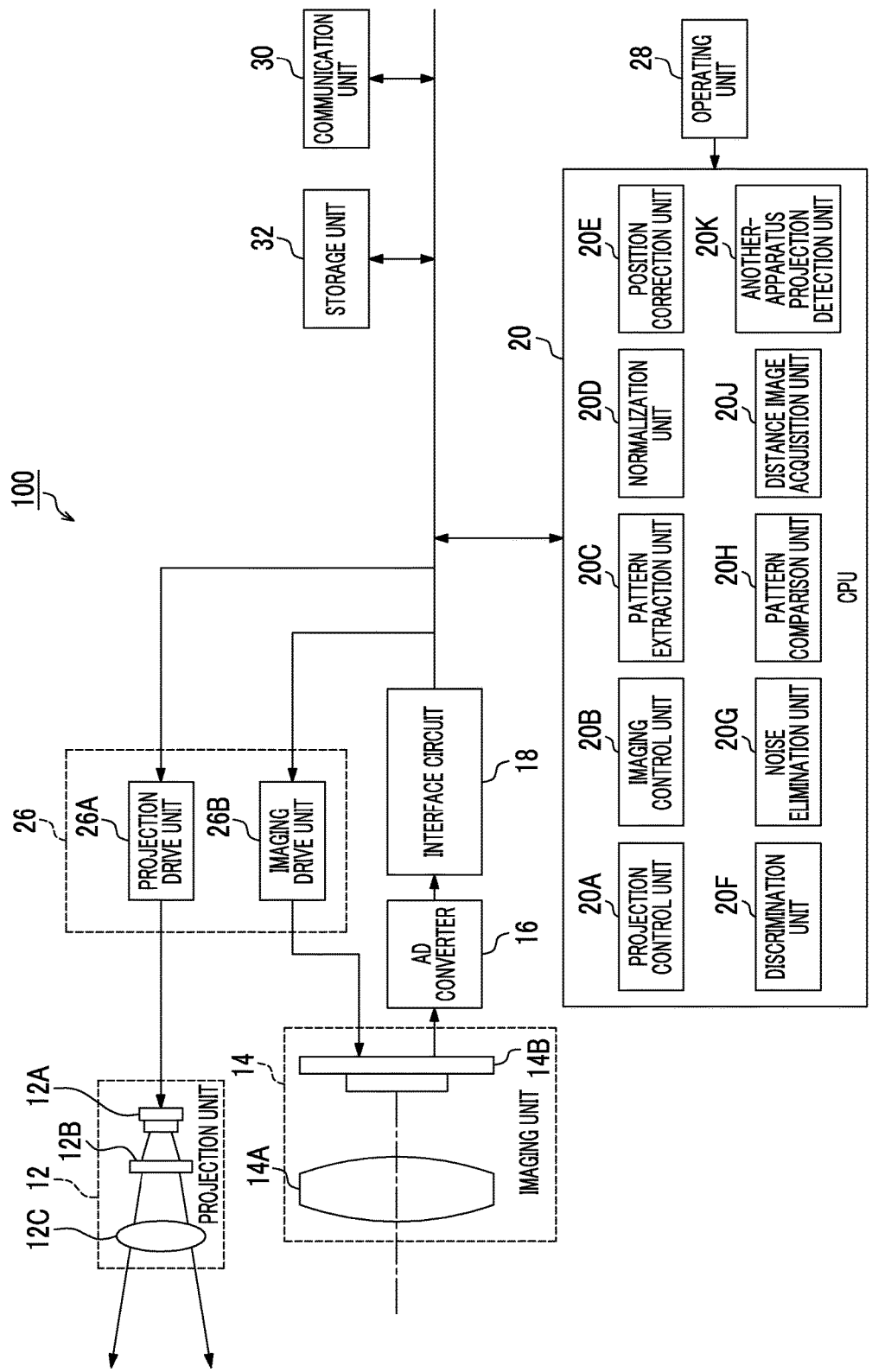
FIG. 13 is a block diagram showing an internal configuration example of a distance image acquisition apparatus of a third embodiment.

In FIG. 13, an another-apparatus projection detection unit 20K detects whether or not the second dot pattern is projected from the another apparatus. There are various aspects of detecting the projection from the another apparatus with the another-apparatus projection detection unit 20K.

First, an aspect in which determination (detection) is made that the second dot pattern is projected from the another apparatus in a case where the number of dots of the dot pattern extracted from the captured image by the pattern extraction unit 20C exceeds the number of dots of the first dot pattern projected from the projection unit 12 is exemplified.

Second, an aspect in which detection is made whether or not the second dot pattern is projected from the another apparatus based on beacon information transmitted from the another apparatus is exemplified. That is, discrimination is made whether or not there is another apparatus within a communication possible range according to a reception result of the beacon information of the communication unit 30. The beacon information can include information indicating a shape of a pattern (second dot pattern) of structured light projected from the another apparatus and modulation information indicating a modulation content of the second dot pattern. In this case, the discrimination unit can acquire information (the shape of the second dot pattern, the modulation information indicating the modulation content, or the like) relating to the second dot pattern projected from the another apparatus based on the beacon information received through the communication unit 30.

Figure 14:
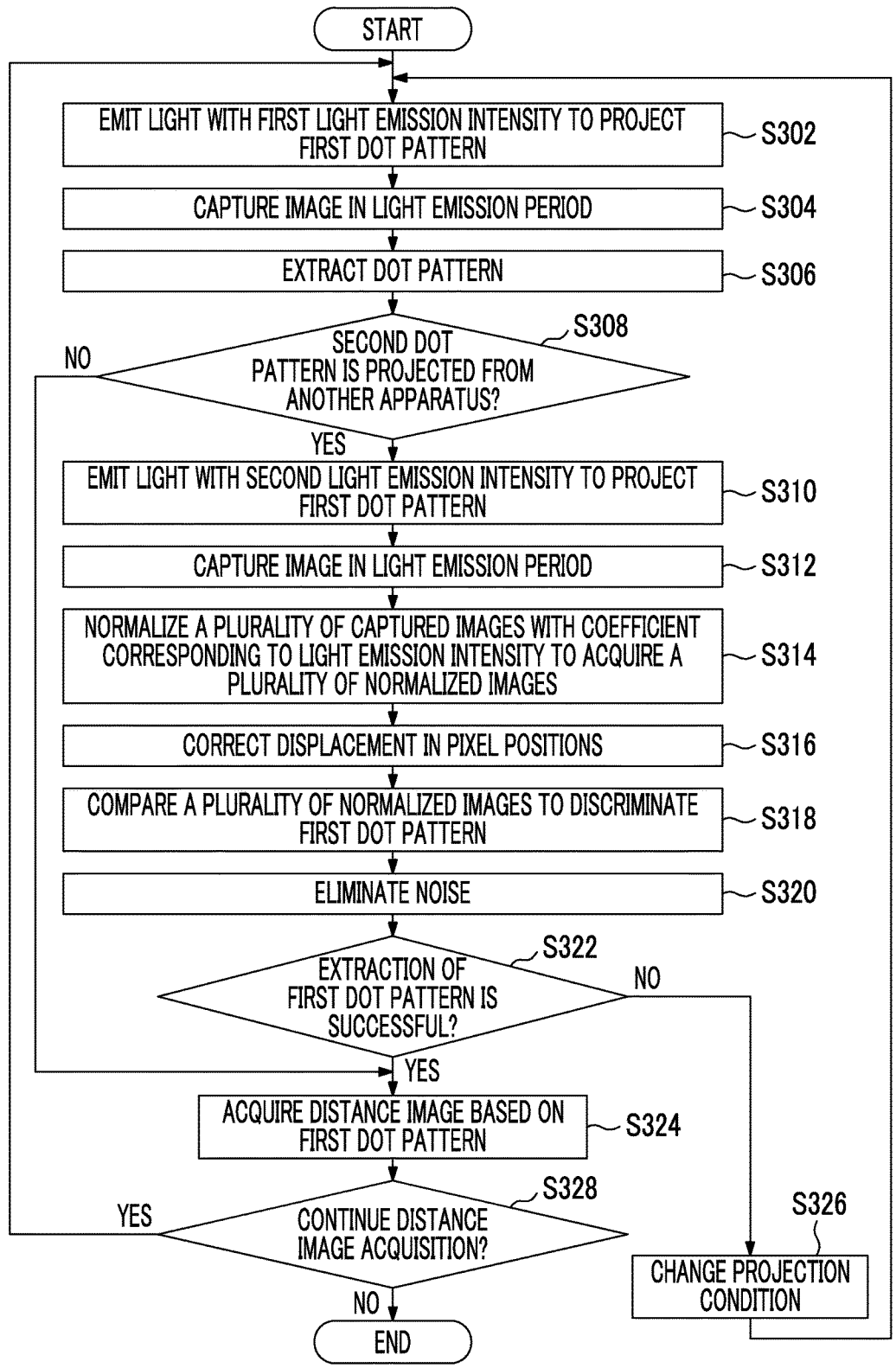
FIG. 14 is a flowchart showing a flow of processing for an example of a distance image acquisition method in the third embodiment.

FIG. 14 is a flowchart showing a flow of processing of an example of a distance image acquisition method of the third embodiment, and shows a flow of processing that is primarily performed according to the program under the control of the CPU 20. This processing is distance image acquisition processing in the video mode, and for example, starts in a case where the shutter button 11 is operated with one push. Hereinafter, a case where the intensity modulation shown in FIG. 8 or 10 is performed will be described as an example.

Steps S302 and S304 are the same as Steps S102 and S104 of the first embodiment shown in FIG. 6.

In Step S308, a dot pattern is extracted from the captured image obtained by imaging in the exposure period EP1 of the first light emission 81 by the pattern extraction unit 20C.

Next, detection is made by the another-apparatus projection detection unit 20K whether or not a dot pattern (second dot pattern) is projected from the another distance image acquisition apparatus (Step S308). The detection can be performed based on determination regarding whether or not the number of dots of the dot pattern extracted in Step S306 is greater than the number of dots of the dot pattern (first dot pattern) projected from the projection unit 12 of the host apparatus, or determination regarding whether or not the beacon information indicating the presence of the another distance image acquisition apparatus is received through the communication unit 30.

In Step S308, in a case where detection is made that the second dot pattern is projected from the another distance image acquisition apparatus (in a case where the determination is YES), the process transitions to Step S310. In Step S308, in a case where detection is made that the second dot pattern is not projected from the another distance image acquisition apparatus (in a case where the determination is NO), the process transitions to Step S324.

Steps S310 and S312 are the same as Steps S106 and S108 of the first embodiment shown in FIG. 6. Steps S314 to S320 are the same as Steps S112 to S118 of the first embodiment shown in FIG. 6. Steps S322 to S328 are the same as Steps S122 to S128 of the first embodiment shown in FIG. 6.

<Variation of Change Projection Condition>

In the first embodiment to the third embodiment described above, there are various variations of change of the projection condition (Step S126 of FIG. 6, Step S228 of FIG. 12, and Step S326 of FIG. 14) with the projection control unit 20A.

As a first aspect, an aspect in which a combination of a plurality of light emission intensities is changed is exemplified. For example, information (light emission intensity combination information) indicating a combination of a plurality of light emission intensities is stored in advance in the storage unit 32. In a case where determination is made that the second dot pattern is mixed yet even after noise elimination in the noise elimination unit 20G based on the result of the comparison of the pattern comparison unit 20H, the projection control unit 20A acquires the light emission intensity combination information from the storage unit 32, thereby changing a combination of light emission intensities in a plurality of times of light emission.

As a second aspect, an aspect in which the light emission timing of the first dot pattern is changed is exemplified. For example, a cycle (or light emission frequency) of a plurality of times of light emission is changed with the projection control unit 20A. The light emission timing may be adjusted by a standby for a given time.

As a third aspect, an aspect in which the number of times of a plurality of times of light emission is changed is exemplified. For example, the number of times of light emission with different light emission intensities is increased by the projection control unit 20A. The number of times of light emission may be decreased. The number of times of light emission may be decreased to once (that is, the intensity modulation may be stopped).

As a fourth aspect, an aspect in which a modulation system of the projection of the first dot pattern is switched is exemplified. A modulation system of a switching destination is roughly classified into a spatial modulation system in which the projection of the first dot pattern is spatially modulated, a temporal modulation system in which the projection of the first dot pattern is temporally modulated, and an intensity modulation system in which the light emission intensity of the first dot pattern is modulated and which is different from the invention.

As the spatial modulation system, for example, a system in which the first dot pattern is projected by vibration is exemplified. In a case of this system, hardware for vibrating the dot pattern projection is provided.

As the temporal modulation system, for example, a system (frequency modulation) in which a wavelength range (or frequency bandwidth) of the projection of the first dot pattern is switched is exemplified. In a case of this system, hardware for switching the wavelength range is provided.

As another temporal modulation system, for example, a system (hereinafter, referred to as a "code modulation system") in which a switching timing of light emission and non-light emission of the first dot pattern is modulated with a code is exemplified. The code modulation system has an advantage in that it is not necessary to add special hardware. Hereinafter, an example of the code modulation system will be described.

<Description of Code Modulation System>

Figure 15:
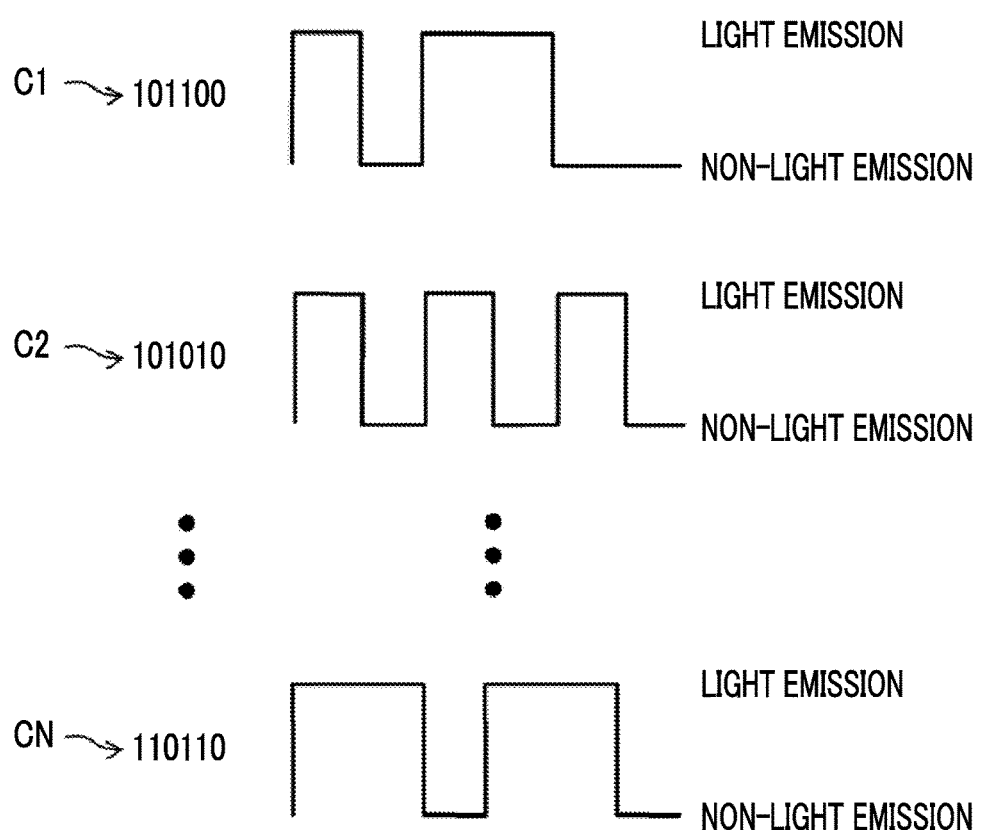
FIG. 15 is an explanatory view of an example of a code which is used in a code modulation system.
Figure 16:
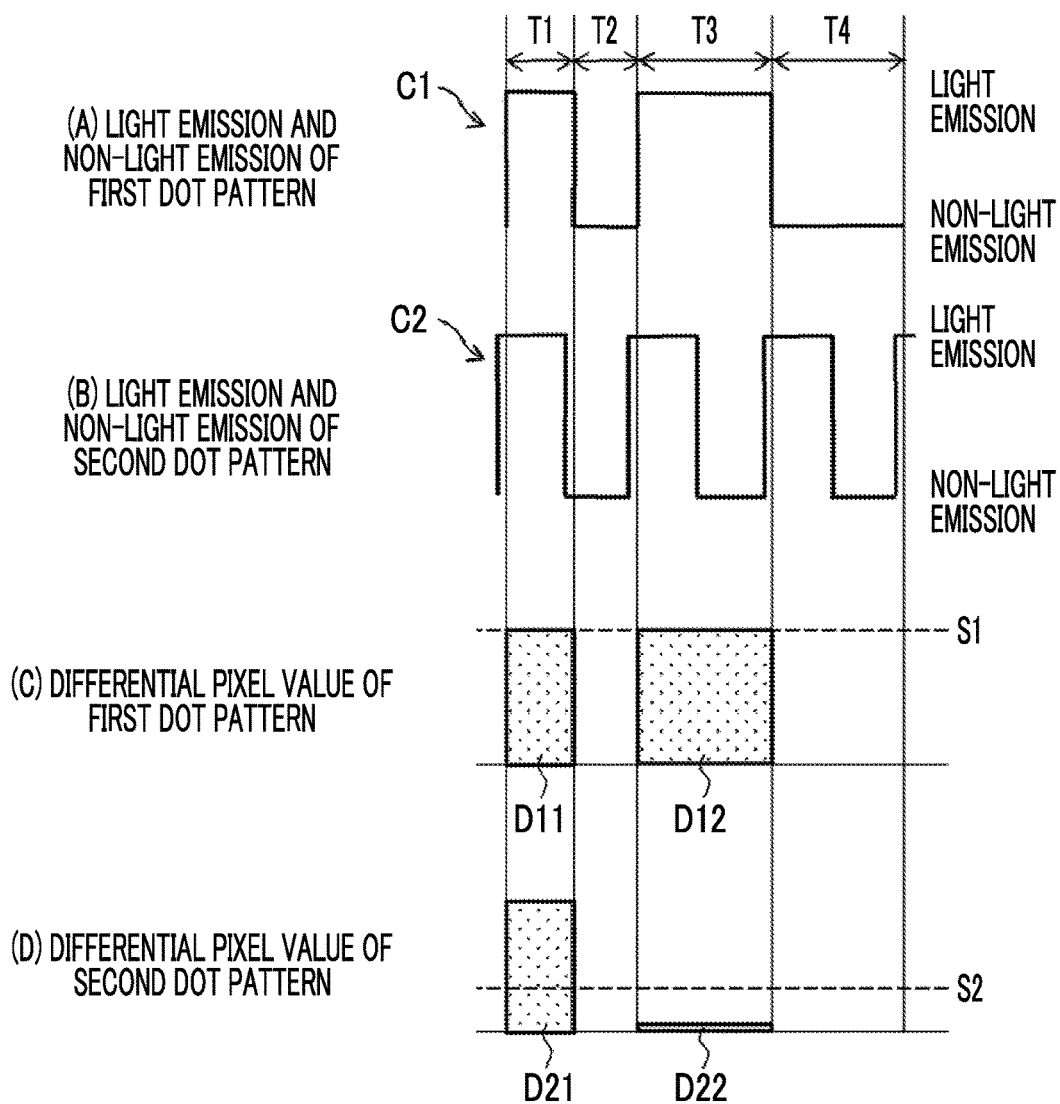
FIG. 16 is an explanatory view illustrating the outline of an example of the code modulation system.
Figure 17:
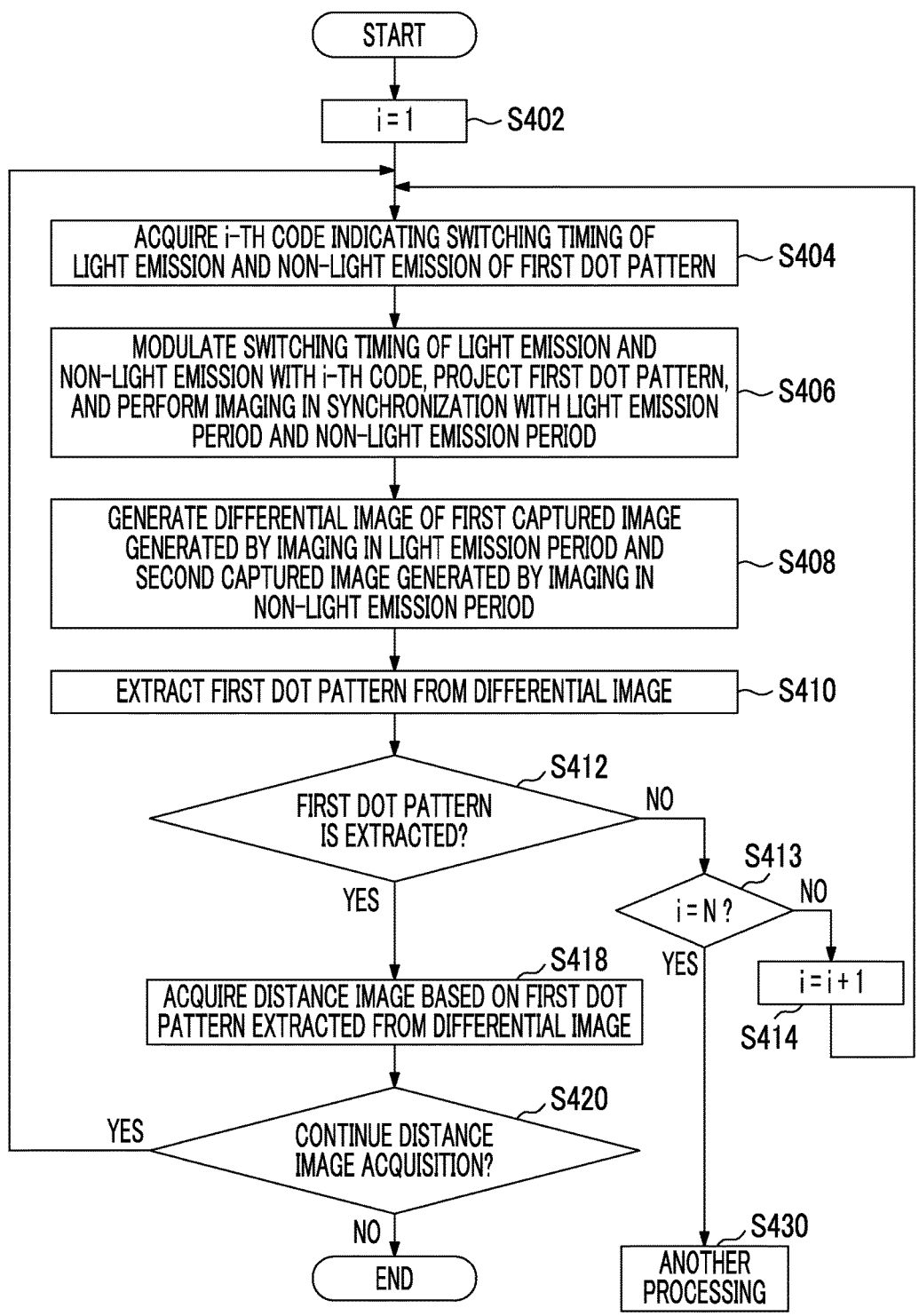
FIG. 17 is a flowchart showing a flow of processing of an example of the code modulation system.

FIG. 15 is an explanatory view of an example of codes for use in the code modulation system, FIG. 16 is an explanatory view illustrating the outline of an example of the code modulation system, and FIG. 17 is a flowchart showing a flow of processing of an example of the code modulation system.

Codes C1 to CN shown on the left side of FIG. 15 are information (hereinafter, referred to as "codes") indicating the switching timing of light emission and non-light emission of the first dot pattern projected from the projection unit 12 as shown on the right side of the drawing. In this example, the codes are stored in advance in the storage unit 32, and the projection control unit modulates the switching timing of light emission and non-light emission (projection and non-projection) of the first dot pattern projected from the projection unit 12 according to a code read from the storage unit 32. In FIG. 15, for ease of understanding, although the codes C1 to CN having a code length of six bits are shown, the code length is not particularly limited. A set of codes having different code lengths may be used. However, in a case of the video mode in which a distance image is acquired continuously, it is preferable that the code length is short.

Hereinafter, a case where the switching timing of light emission and non-light emission of the first dot pattern DP1 is modulated with the code C1 as shown an (A) portion of FIG. 16, and the switching timing of light emission and non-light emission of the second dot pattern DP2 is modulated with the code C2 as shown in a (B) portion of FIG. 16 will be described.

The light receiving elements arranged in a two-dimensional manner on the light receiving surface of the image sensor 14B of the imaging unit 14 are exposed in each of the light emission period (T1, T3 in the drawing) of the first dot pattern and the non-light emission period (T2, T4 in the drawing) of the first dot pattern. A first captured image obtained by imaging in the light emission period of the first dot pattern and a second captured image obtained by imaging in the non-light emission period of the first dot pattern are output from the imaging unit 14. The CPU 20 functions as a differential image generation unit, and generates a differential image by subtracting a pixel value (corresponding to the amount of accumulated electric charge in the non-light emission period) of the second captured image from a pixel value (corresponding to the amount of accumulated electric charge in the light emission period) of the first captured image for each pixel position.

A (C) portion of FIG. 16 schematically shows values (differential pixel values D11, D12) of pixels corresponding to the first dot pattern DP1 in the differential image. The differential pixel value D11 corresponds to a value obtained by subtracting the exposure in the non-light emission period T2 of the first dot pattern DP1 from the exposure in the light emission period T1 of the first dot pattern DP1, and the differential pixel value D12 corresponds to a value obtained by subtracting the exposure in the non-light emission period T4 of the first dot pattern DP1 from the exposure in the light emission period T3 of the first dot pattern DP1. A (D) portion of FIG. 16 shows values (differential pixel values D21, D22) of pixels corresponding to the second dot pattern DP2 in the differential image. The differential pixel value D21 corresponds to a value obtained by subtracting the exposure in the non-light emission period T2 of the second dot pattern DP2 from the exposure in the light emission period T1 of the second dot pattern DP2, and the differential pixel value D22 corresponds to a value obtained by subtracting the exposure in the non-light emission period T4 of the second dot pattern DP2 from the exposure in the light emission period T3 of the second dot pattern DP2.

As shown in the (C) portion and the (D) portion of FIG. 16, since the differential pixel value D11 and the differential pixel value D21 corresponding to the light emission period T1 and the non-light emission period T2 have a small difference, it is difficult to identify, from the differential pixel values D11 and D21, whether a pixel of the differential image is a pixel corresponding to the first dot pattern DP1 projected from the host apparatus or a pixel corresponding to the second dot pattern DP2 projected from the another apparatus.

However, as shown in the (C) portion and the (D) portion of FIG. 16, since the differential pixel value D12 and the differential pixel value D22 corresponding to the light emission period T3 and the non-light emission period T4 have a large difference, it is possible to identify, from the differential pixel values D12 and D22, whether a pixel of the differential image is a pixel corresponding to the first dot pattern DP1 projected from the host apparatus or a pixel corresponding to the second dot pattern DP2 projected from the another apparatus. That is, since the code of the switching timing of light emission and non-light emission is different between the first dot pattern DP1 and the second dot pattern DP2, the differential pixel values are integrated for each pixel position over the periods T1 to T4 corresponding to the code length of the code C1 of the host apparatus, thereby identifying the first dot pattern DP1. The code C1 indicates the switching timing of a plurality of light emission periods T1 and T3 and a plurality of non-light emission periods T2 and T4, and a plurality of light emission periods T1 and T3 are different in time length (in this example, T1<T3). Furthermore, a plurality of non-light emission periods T2 and T4 are different in time length (in this example, T2<T4).

The CPU 20 of this example integrates, for example, the differential pixel values for each pixel position over the periods T1 to T4 corresponding to the code length of the code C1 of the host apparatus as the differential image generation unit. In the drawing, S1 and S4 are values corresponding to the integrated values. In a case where the integrated value is equal to or greater than a threshold, the differential pixel can be discriminated to be a pixel of the first dot pattern, and in a case where the integrated value is less than the threshold, the differential pixel can be discriminated to be not a pixel of the first dot pattern. That is, through comparison of the integrated value (D11+D12) of the differential pixel values D11 and D12 with the threshold, a pixel of the differential image is identified to be a pixel constituting the first dot pattern, and through comparison of the integrated value (D21+D22) of the differential pixel values D21 and D22 shown in the (D) portion of the FIG. 16 with the threshold, a pixel of the differential image is identified to be not a pixel constituting the first dot pattern. S1 in FIG. 16 corresponds to the integrated value (D11+D12), and S2 in FIG. 16 corresponds to the integrated value (D21+D22). The first dot pattern may be extracted from the differential image by classifying a group of pixels, in which the integrated value of the differential pixel values is relatively large in the differential image and a group of pixels, in which the integrated value of the differential pixel values is relatively small in the differential image, using a histogram, and determining the group of pixels, in which the integrated value of the differential pixel values is relatively large, to be a group of pixels of the first dot pattern.

FIG. 17 shows a flow of processing that is primarily performed according to the program under the control of the CPU 20. This processing is distance image acquisition processing in the video mode, and for example, starts in a case where the shutter button 11 is operated with one push.

First, the CPU 20 sets a variable i for identifying a code to "1" as an initial value (Step S402).

Next, the projection control unit (functioning as a code modulation unit) is made to acquire an i-th code (Ci) indicating the switching timing of light emission and non-light emission of the first dot pattern from the storage unit 32 (Step S404).

Next, the switching timing of light emission and non-light emission of the first dot pattern is modulated with the i-th code by the projection control unit, the first dot pattern is projected from the projection unit 12 onto the subject within the distance measurement region, and the subject within the distance measurement region is imaged by the imaging unit 14 in synchronization with the light emission period and the non-light emission period of the first dot pattern (Step S406). A plurality of captured images including the first dot pattern reflected from the subject, for example, a first captured image obtained by imaging in the light emission period of the first dot pattern and a second captured image obtained by imaging in the non-light emission period of the first dot pattern are output from the imaging unit 14.

Next, a differential image of the first captured image obtained by imaging in the light emission period and the second captured image obtained by imaging in the non-light emission period are generated by the CPU 20 (Step S408).

Next, the first dot pattern is extracted from the differential image by the pattern extraction unit (Step S410).

Next, determination is made whether or not the first dot pattern is actually extracted from the differential image (Step S412). In a case where determination is made that the first dot pattern is extracted (in a case where the determination in Step S412 is YES), the distance image is acquired by the distance image acquisition unit based on the first dot pattern extracted from the differential image (Step S418).

In Step S412, in a case where determination is made that first dot pattern is not extracted (in a case where the determination in Step S412 is NO), determination is made whether or not the variable i for identifying the code is a maximum value N (Step S413). In a case where the variable i is not the maximum value N, the variable i is incremented (i=i+1) (Step S414), and the process returns to Step S404. Then, the next code is acquired, and Steps S406 to S410 are repeated.

The CPU 20 determines whether or not to continue the distance image acquisition (Step S420), and in a case where determination is made to continue the distance image acquisition (in a case where the determination in Step S420 is YES), in this example, Steps S404 to S418 are repeated without changing the variable i for identifying the code. In a case where determination is made not to continue the distance image acquisition (in a case where the determination in Step S420 is NO), this processing ends. This processing is the distance image acquisition in the video mode, and ends in a case where the shutter button 11 is operated with one push again.

In a case where the first dot pattern is not extracted from the differential image with all codes, another processing is performed by the CPU 20 (Step S430). Usually, since the first dot pattern is extracted, Step S430 may be performed as error processing.

In the above-described code modulation system, the longer the code length, the longer a processing of projection and imaging becomes. Accordingly, it is considered that, in the video mode, the intensity modulation in the invention is first performed, and in a case where the distance image cannot be acquired, the processing of the above-described code modulation system is performed.

A configuration may be made in which a random code is generated and the switching timing of light emission and non-light emission is modulated based on the random code by the projection control unit.

<Variation of Normalization>

In regard to the normalization processing of the normalization unit 20D, that is, normalization of the magnitude of the pixel value of the captured image, an aspect in which normalization is performed in units of pixels, and an aspect in which normalization is performed in units of dots of a dot pattern (that is, in units of patterns) are exemplified.

In the aspect in which normalization is performed in units of pixels, in a case where the subject moves at a high speed, the pixel values in units of pixels of the dot pattern largely fluctuate with large fluctuation of the distance to the subject. That is, selection of a set value, such as a threshold, becomes difficult according to a use environment, and in a case where the set value, such as the threshold, is not appropriate, it is considered that discrimination becomes difficult. As a countermeasure, there are an aspect in which the set value, such as the threshold, is variable according to circumstances while performing normalization in units of pixels, and an aspect in which normalization in units of dots is performed in consideration of light propagation characteristics.

In normalization in units of dots, light emission is performed from the projection unit 12 with dots having the same size, and the normalization unit 20D calculates an integrated value (an integrated value of pixel values of a plurality of pixels in a contour of a dot) of pixel values in units of dots and performs normalization such that the integrated value after normalization is identical regardless of the light emission intensity. That is, normalization is performed in units of dots, whereby it is possible to appropriately perform discrimination of the first dot pattern even in an environment in which the distance to the subject significantly changes instantly.

<Video Mode and Static Image Mode>

In the video mode, the imaging unit 14 performs exposure in an exposure period corresponding to the frame rate of a continuous distance image, and the projection control unit 20A (light modulation unit) that has a function of intensity modulation performs switching of projection (light emission) and non-projection (non-light emission) of the first dot pattern of the projection unit 12 in synchronization with the start and end timings of the exposure period of the imaging unit 14.

The invention is not particularly limited to a case (video mode) of acquiring the continuous distance image, can be carried out in a case (static image mode) of performing distance image acquisition for one frame.

<Variation of Apparatus that the Invention is Applicable>

An aspect to which the invention is applicable is not limited to a distance image acquisition apparatus having a single function of acquiring a distance image, and a general digital camera or a video camera which can capture a color image may have a distance image acquisition function. The invention is also applicable to mobile apparatuses which have, in addition to a distance image acquisition function, functions (a call handling function, a communication function, and other computer functions) other than the distance image acquisition function. As other aspects to which the invention is applicable, for example, mobile phones, smartphones, personal digital assistants (PDA), and portable game machines are exemplified. Hereinafter, an example of a smartphone to which the invention is applicable will be described.

Figure 18:
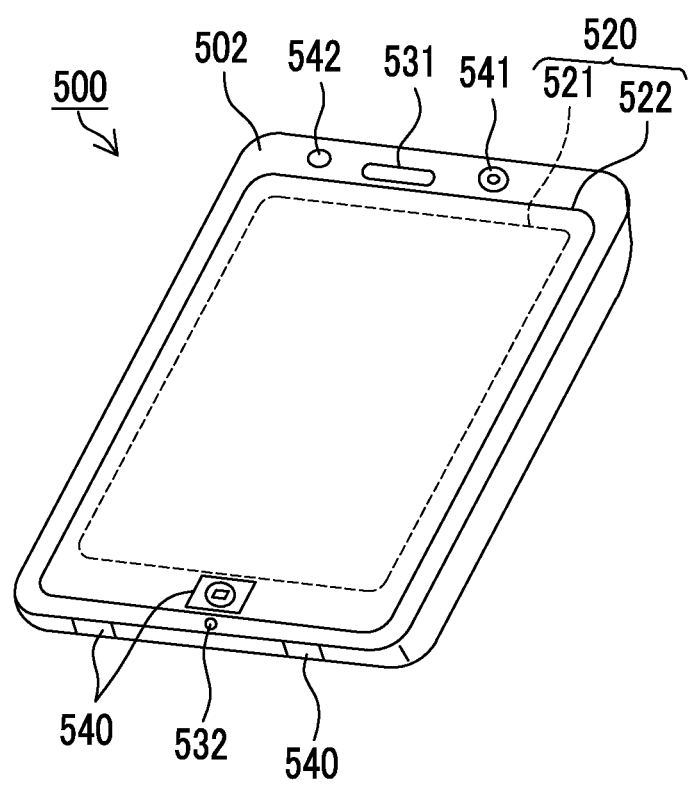
FIG. 18 is an appearance diagram of a smartphone which is an example of the distance image acquisition apparatus.

FIG. 18 is a perspective view showing the appearance of a smartphone 500 which is an embodiment of a distance image acquisition apparatus.

The smartphone 500 shown in FIG. 18 has a flat plate-shaped housing 502, and comprises a display input unit 520 in which a display panel 521 as a display unit and an operation panel 522 as an input unit are integrated on one surface of the housing 502. The housing 502 comprises a speaker 531, a microphone 532, an operating unit 540, a camera unit 541, and a projection unit 542. The configuration of the housing 502 is not limited thereto, and for example, a configuration in which the display unit and the input unit are independent from each other may be employed, or a configuration having a folding structure or a slide mechanism may be employed.

Figure 19:
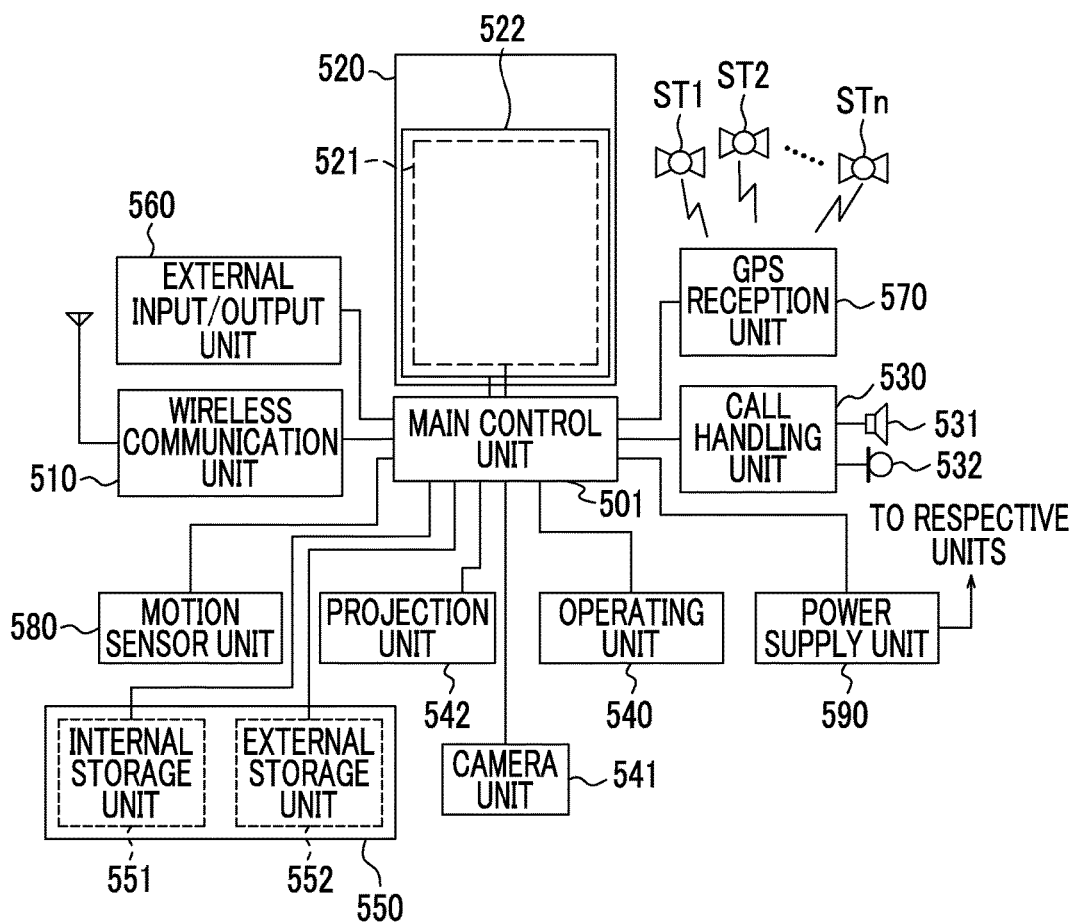
FIG. 19 is a block diagram showing the configuration of the smartphone.
Figure 20:
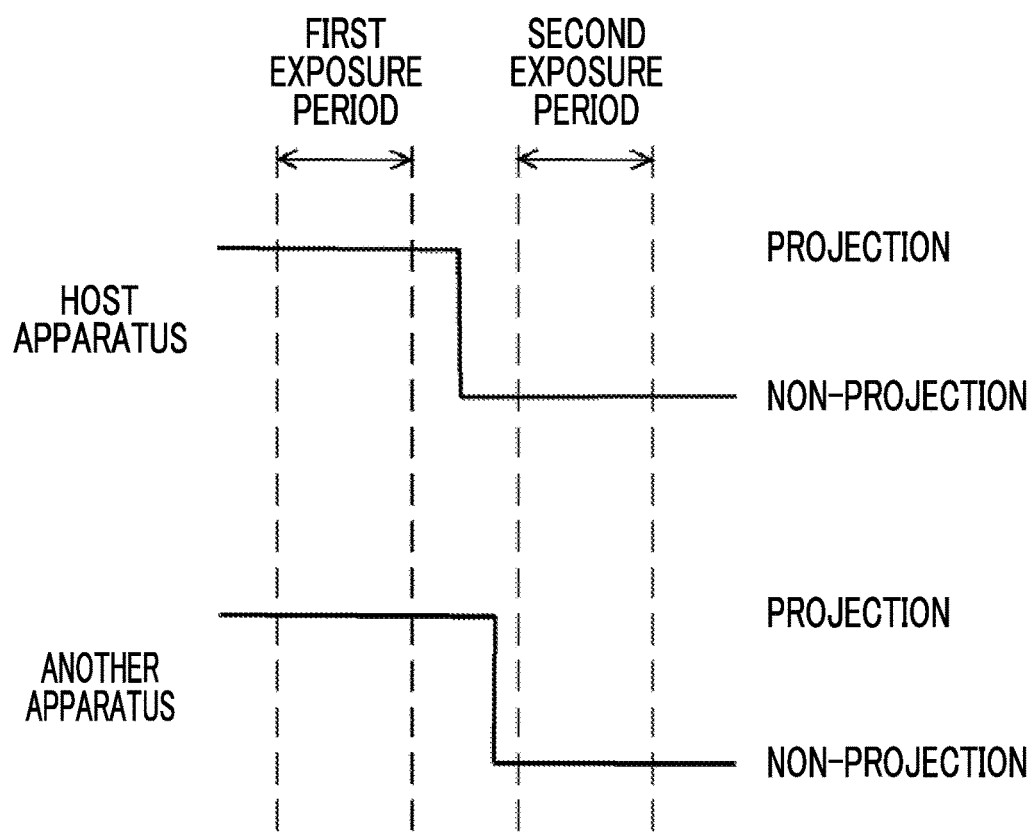
FIG. 20 is an explanatory view illustrating a problem that the invention is to solve.

FIG. 19 is a block diagram of the smartphone 500 shown in FIG. 18. As shown in FIG. 19, the smartphone 500 comprises, as principal components, a wireless communication unit 510, a display input unit 520, a call handling unit 530, an operating unit 540, a camera unit 541 functioning as an imaging unit, a storage unit 550, an external input/output unit 560, a global positioning system (GPS) reception unit 570, a motion sensor unit 580, a power supply unit 590, and a main control unit 501. The smartphone 500 has, as a principal function, a wireless communication function of performing mobile wireless communication through a base station device and a mobile communication network.

The wireless communication unit 510 performs wireless communication with the base station device in the mobile communication network according to an instruction of the main control unit 501. With the use of the wireless communication, transmission and reception of various kinds of file data, such as music data and image data, and electronic mail data, or reception of Web data, streaming data, or the like is performed.

The display input unit 520 is a so-called touch panel which displays images (static images and videos), text information, or the like to visually transfer information to the user and detects a user's operation on the displayed information under the control of the main control unit 501, and comprises the display panel 521 and the operation panel 522. In a case where a generated three-dimensional image is viewed, it is preferable that the display panel 521 is a three-dimensional display panel.

The display panel 521 uses a liquid crystal display (LCD), an organic electro-luminescence display (OELD), or the like as a display device.

The operation panel 522 is a device which is placed such that an image displayed on a display surface of the display panel 521 is visible, and detects one or a plurality of coordinates operated by a user's finger or a stylus. In a case where the device is operated with the user's finger or the stylus, a detection signal generated due to the operation is output to the main control unit 501. Next, the main control unit 501 detects an operation position (coordinates) on the display panel 521 based on the received detection signal.

As shown in FIG. 18, although the display panel 521 and the operation panel 522 of the smartphone 500 are integrated to constitute the display input unit 520, the operation panel 522 is arranged so as to completely cover the display panel 521. In a case where this arrangement is employed, the operation panel 522 may have a function of detecting a user's operation even in a region outside the display panel 521. In other words, the operation panel 522 may have a detection region (hereinafter, referred to as a display region) for a superimposed portion overlapping the display panel 521 and a detection region (hereinafter, referred to as a non-display region) for an outer edge portion not overlapping the display panel 521 other than the display region.

Although the size of the display region may completely coincide with the size of the display panel 521, both of the size of the display region and the size of the display panel 521 are not necessarily made to coincide with each other. The operation panel 522 may have two sensitive regions including an outer edge portion and an inner portion other than the outer edge portion. The width of the outer edge portion is appropriately designed according to the size of the housing 502 or the like. As a position detection system which is employed in the operation panel 522, a matrix switching system, a resistive film system, a surface acoustic wave system, an infrared system, an electromagnetic induction system, an electrostatic capacitance system, and the like are exemplified, and any system may be employed.

The call handling unit 530 comprises the speaker 531 and the microphone 532, converts speech of the user input through the microphone 532 to speech data processable in the main control unit 501 and outputs speech data to the main control unit 501, or decodes speech data received by the wireless communication unit 510 or the external input/output unit 560 and outputs speech from the speaker 531. As shown in FIG. 18, for example, the speaker 531 and the microphone 532 can be mounted on the same surface as the surface on which the display input unit 520 is provided.

The operating unit 540 is a hardware key using a key switch or the like, and receives an instruction from the user. For example, the operating unit 540 is a push button type switch which is mounted on a lower surface below the display unit of the housing 502 of the smartphone 500, and is turned on in a case of being pressed with a finger or the like and is brought into an off state by restoration force of the panel or the like in a case where the finger is released.

The storage unit 550 stores a control program or control data of the main control unit 501, address data associated with the name, telephone number, and the like of a communication partner, data of transmitted and received electronic mail, Web data downloaded by Web browsing, and downloaded content data, and temporarily stores streaming data or the like. The storage unit 550 is constituted of an internal storage unit 551 embedded in the smartphone and an external storage unit 552 having a slot for a detachable external memory. Each of the internal storage unit 551 and the external storage unit 552 constituting the storage unit 550 is realized using a memory (for example, a Micro SD (Registered Trademark) memory, such as a flash memory type, a hard disk type, a multimedia card micro type, or a card type, or a storage medium, such as a random access memory (RAM) or a read only memory (ROM).

The external input/output unit 560 plays a role of an interface with all external devices connected to the smartphone 500, and is provided for direct or indirect connection to other external devices through communication or the like (for example, a universal serial bus or the like) or network (for example, the Internet, a wireless local area network (LAN), Bluetooth (Registered Trademark), radio frequency identification (RFID), infrared data association (IrDA), Ultra Wideband (UWB) (Registered Trademark), ZigBee (Registered Trademark), or the like).

The external devices connected to the smartphone 500 are, for example, a wired/wireless headset, a wired/wireless external charger, a wired/wireless data port, a memory card, a subscriber identity module (SIM) card, or a user identity module (UIM) card connected through a card socket, an external audio-video device connected through an audio-video input/output (I/O) terminal, an external audio-video device connected in a wireless manner, a smartphone connected in a wired or wireless manner, a personal computer connected in a wired/wireless manner, a PDA connected in a wired/wireless manner, an earphone, and the like. The external input/output unit can transfer data transmitted from the external devices to the respective components in the smartphone 500 or can transmit data in the smartphone 500 to the external devices.

The GPS reception unit 570 receives GPS signals transmitted from GPS satellites ST1 to STn according to an instruction of the main control unit 501, performs positioning calculation processing based on a plurality of received GPS signals, and detects the position of the smartphone 500 having latitude, longitude, and altitude. When position information can be acquired from the wireless communication unit 510 or the external input/output unit 560 (for example, a wireless LAN), the GPS reception unit 570 can detect the position using the position information.

The motion sensor unit 580 comprises, for example, a three-axis acceleration sensor or the like, and detects physical motion of the smartphone 500 according to an instruction of the main control unit 501. The moving direction or acceleration of the smartphone 500 is detected by detecting physical motion of the smartphone 500. The detection result is output to the main control unit 501.

The power supply unit 590 supplies electric power stored in a battery (not shown) to the respective units of the smartphone 500 according to an instruction of the main control unit 501.

The main control unit 501 is provided with a microprocessor, operates according to the control program or control data stored in the storage unit 550, and integrally controls the respective units of the smartphone 500. The main control unit 501 has a mobile communication control function of controlling respective units of a communication system in order to perform speech communication or data communication through the wireless communication unit 510, and an application processing function.

The application processing function is realized by the main control unit 501 operating according to application software stored in the storage unit 550. The application processing function is, for example, an infrared communication function of controlling the external input/output unit 560 to perform data communication with a device facing the smartphone 500, an electronic mail function of transmitting and receiving electronic mail, a Web browsing function of browsing Web pages, or the like.

The main control unit 501 has an image processing function of displaying video on the display input unit 520, or the like based on image data (static image or video data), such as received data or downloaded streaming data. The image processing function refers to a function of the main control unit 501 decoding image data, performing image processing on the decoding result, and displaying an image on the display input unit 520.

The main control unit 501 performs display control on the display panel 521 and operation detection control for detecting a user's operation through the operating unit 540 and the operation panel 522.

With performing the display control, the main control unit 501 displays an icon for activating application software or a software key, such as a scroll bar, or displays a window for creating electronic mail. The scroll bar refers to a software key for receiving an instruction to move a display portion of an image which is too large to fit into the display area of the display panel 521.

With performing the operation detection control, the main control unit 501 detects a user's operation through the operating unit 540, receives an operation on the icon or an input of text in an entry column of the window through the operation panel 522, or receives a scroll request of a display image through the scroll bar.

In addition, with performing the operation detection control, the main control unit 501 has a touch panel control function of determining whether or not an operation position on the operation panel 522 is the superimposed portion (display region) overlapping the display panel 521 or the outer edge portion (non-display region) not overlapping the display panel 521 other than the display region, and controlling the sensitive region of the operation panel 522 or the display position of the software key.

The main control unit 501 may detect a gesture operation on the operation panel 522 and may perform a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 541 is an imaging device which performs electronic imaging using an image sensor, such as a complementary metal oxide semiconductor (CMOS) or a charge-coupled device (CCD).

In this case, it is preferable that the camera unit 541 is provided with a plurality of light receiving elements having different light reception wavelength ranges in one image sensor, and light receiving elements (R pixel, G pixel, and B pixel) for color imaging are mixed and arranged in a two-dimensional manner. That is, as the image sensor of the camera unit 541, an image sensor in which an R pixel, a G pixel, and a B pixel provided with color filters of RGB for color imaging and pixels (pixels having sensitivity only to projection light) provided with a band-pass filter or a cut filter for distance image acquisition are mixed is preferably used.

The projection unit 542 has an LED, and projects a first dot pattern of light at the time of acquisition of the distance image. In a case of the smartphone 500 having an optical communication function, the LED can be used as a light source of optical communication.

Under the control of the main control unit 501, the camera unit 541 can convert image data of visible light obtained by imaging to compressed image data in a format of, for example, Joint Photographic coding Experts Group (JPEG) or the like and can record compressed image data in the storage unit 550 or can output compressed image data through the external input/output unit 560 or the wireless communication unit 510, and similarly, can record the distance image indicating the distance of the subject in the storage unit 550 or can output the distance image through the external input/output unit 560 or the wireless communication unit 510. In the smartphone 500 shown in FIG. 18, although the camera unit 541 is mounted on the same surface as the display input unit 520, the mounting position of the camera unit 541 is not limited thereto, and the camera unit 541 may be mounted on a rear surface of the display input unit 520, or a plurality of camera units 541 may be mounted. In a case where a plurality of camera units 541 are mounted, the camera unit 541 for imaging may be switched to perform imaging alone, or a plurality of camera units 541 may be used simultaneously to perform imaging.

The camera unit 541 can be used for various functions of the smartphone 500. For example, an image acquired by the camera unit 541 can be displayed on the display panel 521, or an image in the camera unit 541 can be used as one operation input of the operation panel 522. In a case where the GPS reception unit 570 detects the position, the position may be detected with reference to an image from the camera unit 541. In addition, the optical axis direction of the camera unit 541 of the smartphone 500 may be determined or a current use environment may be determined with reference to an image from the camera unit 541 without using the three-axis acceleration sensor or using the three-axis acceleration sensor. Of course, an image from the camera unit 541 may be used within application software.

For example, the projection unit 542 may constitute a projection unit in the invention. For example, the camera unit 541 may constitute an imaging unit in the invention. For example, the main control unit 501 may constitute a projection control unit, an imaging control unit, a pattern extraction unit, a normalization unit, a position correction unit, a discrimination unit, a noise elimination unit, a pattern comparison unit, a distance image acquisition unit, and an another-apparatus projection detection unit in the invention. Though not shown, a beacon information reception unit is provided in the smartphone 500.

The invention is not limited to the above-described embodiments, and it is needless to say that various modifications can be made without departing from the gist of the invention.

EXPLANATION OF REFERENCES 10, 100: distance image acquisition apparatus, 12: projection unit, 14: imaging unit, 16: AD converter, 18: interface circuit, 20: CPU, 20A: projection control unit, 20B: imaging control unit, 20C: pattern extraction unit, 20D: normalization unit, 20E: position correction unit, 20F: discrimination unit, 20G: noise elimination unit, 20H: pattern comparison unit, 20J: distance image acquisition unit, 20K: another-apparatus projection detection unit, 26: drive unit, 26A: projection drive unit, 26B: imaging drive unit, 28: operating unit, 30: communication unit, 32: storage unit

What is claimed is:

1. A distance image acquisition apparatus comprising:
   a projection unit which performs a plurality of times of light emission with a plurality of light emission intensities to project a first pattern of structured light distributed in a two-dimensional manner with respect to a subject within a distance measurement region;
   an imaging unit which is provided in parallel with and apart from the projection unit by a baseline length, images the subject in synchronization with each of the plurality of times of light emission and generates a plurality of captured images including the first pattern reflected from the subject and corresponding to the plurality of light emission intensities;
   a normalization unit which normalizes the plurality of captured images with coefficients corresponding to the plurality of light emission intensities to acquire a plurality of normalized images;
   a discrimination unit which compares the plurality of normalized images and discriminates the first pattern projected from the projection unit; and a distance image acquisition unit which acquires a distance image indicating a distance of the subject based on a result of the discrimination of the discrimination unit.

2. The distance image acquisition apparatus according to claim 1,
wherein the discrimination unit calculates the difference of pixel values of the plurality of normalized images at corresponding positions of the plurality of normalized images and discriminates a pixel having an absolute value of the difference of the pixel values equal to or less than a threshold to be a pixel indicating the first pattern.

3. The distance image acquisition apparatus according to claim 1,
wherein the discrimination unit calculates a ratio of pixel values of the plurality of normalized images at corresponding positions of the plurality of normalized images and discriminates a pixel having the ratio of the pixel values within a range of an upper limit value and a lower limit value to be a pixel indicating the first pattern.

4. The distance image acquisition apparatus according to claim 1, further comprising:
a position correction unit which detects a correspondence relationship between pixel positions of the plurality of normalized images and corrects displacement in pixel positions,
wherein the discrimination unit compares the plurality of normalized images after the displacement in pixel positions is corrected by the position correction unit.

5. The distance image acquisition apparatus according to claim 1, further comprising:
a noise elimination unit which eliminates noise from at least one image of the plurality of captured images and the plurality of normalized images based on the result of the discrimination of the discrimination unit,
wherein the distance image acquisition unit acquires the distance image from an image with noise eliminated by the noise elimination unit.

6. The distance image acquisition apparatus according to claim 1, further comprising:
a pattern extraction unit which extracts a pattern including the first pattern and a second pattern of structured light projected from another distance image acquisition apparatus from at least one image of the plurality of captured images and the plurality of normalized images; and
a noise elimination unit which eliminates the second pattern from the pattern extracted by the pattern extraction unit based on the result of the discrimination of the discrimination unit,
wherein the distance image acquisition unit acquires the distance image from the first pattern which remains after the second pattern is eliminated by the noise elimination unit.

7. The distance image acquisition apparatus according to claim 1,
wherein the projection unit emits light in an invisible wavelength range to project the first pattern onto the subject, and
the imaging unit images the subject in the invisible wavelength range.

8. The distance image acquisition apparatus according to claim 1,
wherein the imaging unit images the subject in a period during which the projection unit is non-light emission, and
the normalization unit acquires the plurality of normalized images based on a result of subtracting a captured image captured by the imaging unit in a non-light emission period of the projection unit from each of the plurality of captured images captured by the imaging unit in a light emission period of the projection unit.

9. The distance image acquisition apparatus according to claim 1,
wherein the first pattern projected from the projection unit and a second pattern projected from another distance image acquisition apparatus are dot patterns, and
the distance image acquisition apparatus further comprises:
a pattern comparison unit which compares the number of projected dots that is the number of dots of the first pattern projected from the projection unit with the number of discriminated dots that is the number of dots of a pattern discriminated to be a first pattern by the discrimination unit; and
a projection control unit which changes a projection condition of the first pattern in the projection unit based on a result of the comparison of the number of projected dots and the number of discriminated dots of the pattern comparison unit.

10. The distance image acquisition apparatus according to claim 9,
wherein the projection control unit changes a combination of the plurality of light emission intensities based on the result of the comparison of the pattern comparison unit.

11. The distance image acquisition apparatus according to claim 9,
wherein the projection control unit changes a light emission timing of the first pattern based on the result of the comparison of the pattern comparison unit.

12. The distance image acquisition apparatus according to claim 9,
wherein the projection control unit modulates a switching timing of light emission and non-light emission of the first pattern with a code based on the result of the comparison of the pattern comparison unit.

13. The distance image acquisition apparatus according to claim 9,
wherein the projection control unit changes the number of times of light emission of the plurality of times of light emission based on the result of the comparison of the pattern comparison unit.

14. The distance image acquisition apparatus according to claim 1, further comprising:
an another-apparatus projection detection unit which detects whether or not a second pattern of structured light is projected from another distance image acquisition apparatus,
wherein, in a case where the another-apparatus projection detection unit detects that the second pattern is projected from the another distance image acquisition apparatus, intensity modulation to perform a plurality of times of light emission with the plurality of light emission intensities starts with the projection unit.

15. The distance image acquisition apparatus according to claim 1,
wherein the imaging unit performs exposure in an exposure period corresponding to a frame rate of the distance image, and the projection unit projects the first pattern in synchronization with start and end timings of the exposure period of the imaging unit.

16. A distance image acquisition method comprising:

a step of, with a projection unit, performing a plurality of times of light emission with a plurality of light emission intensities to project a first pattern of structured light distributed in a two-dimensional manner with respect to a subject within a distance measurement region;

a step of, with an imaging unit provided in parallel with and apart from the projection unit by a baseline length, imaging the subject in synchronization with each of the plurality of times of light emission and generating a plurality of captured images including the first pattern reflected from the subject and corresponding to the plurality of light emission intensities;

a step of normalizing the plurality of captured images with coefficients corresponding to the plurality of light emission intensities to acquire a plurality of normalized images;

a step of comparing the plurality of normalized images and discriminating the first pattern projected from the projection unit; and a step of acquiring a distance image indicating a distance of the subject based on a result of the discrimination.

* * * * *